United States Patent [19]
Takeda et al.

[11] Patent Number: 5,739,952
[45] Date of Patent: Apr. 14, 1998

[54] POLARIZING BEAM SPLITTER AND OPTICAL HEAD ASSEMBLY

[75] Inventors: Tadashi Takeda; Yoshio Hayashi, both of Nagano; Hideo Takezoe; Ken Ishikawa, both of Tokyo, all of Japan

[73] Assignee: Kabushiki Kaisha Sankyo Seiki Seisakusho, Nagano, Japan

[21] Appl. No.: 421,904

[22] Filed: Apr. 14, 1995

[30] Foreign Application Priority Data

| Apr. 14, 1994 | [JP] | Japan | 6-100668 |
| Apr. 14, 1994 | [JP] | Japan | 6-100669 |
| Apr. 14, 1994 | [JP] | Japan | 6-100670 |
| May 31, 1994 | [JP] | Japan | 6-141147 |

[51] Int. Cl.$^6$ ............................................. G02B 5/18
[52] U.S. Cl. ........................ 359/495; 359/576; 369/44.12; 369/112
[58] Field of Search ................................ 359/494, 495, 359/498, 576; 369/44.12, 112

[56] References Cited

U.S. PATENT DOCUMENTS

| 4,531,809 | 7/1985 | Carter et al. | 359/572 |
| 5,134,516 | 7/1992 | Lehureau et al. | 359/495 |
| 5,172,368 | 12/1992 | Lehureau | 369/112 |
| 5,207,862 | 5/1993 | Baker et al. | 385/130 |
| 5,235,449 | 8/1993 | Imazeki et al. | 359/485 |
| 5,245,471 | 9/1993 | Iwatsuka et al. | 359/576 |
| 5,367,403 | 11/1994 | Yamamoto et al. | 359/495 |
| 5,493,555 | 2/1996 | Kimura et al. | 369/112 |

FOREIGN PATENT DOCUMENTS

| 57-32405 | 2/1982 | Japan | 359/495 |
| 63-26604 | 2/1988 | Japan | G02B 5/30 |
| 01-201849 | 8/1989 | Japan | G11B 11/10 |
| 02-12106 | 1/1990 | Japan | 359/494 |
| 05-250751 | 9/1993 | Japan | G11B 11/10 |
| 06-130224 | 5/1994 | Japan | 359/495 |
| 92/21046 | 11/1992 | WIPO | 359/495 |

OTHER PUBLICATIONS

K.B. Rochford, et al., "Fabrication of Integrated Optical Structures in Polydiacetylene Films by Irreversible Photo induced Bleaching", *Appl. Phys. Lett.* 55(12) Sep. 1989, pp. 1161–1163.

*Primary Examiner*—Paul M. Dzierzynski
*Assistant Examiner*—John Juba, Jr.
*Attorney, Agent, or Firm*—Sughrue, Mion, Zinn, Macpeak & Seas, PLLC

[57] ABSTRACT

A polarizing beam splitter includes: an optically isotropic substrate; a layer of birefringent material formed on top of said optically isotropic substrate; and a periodic pattern of ridges and grooves formed on a surface of said optically isotropic substrate to make a grating; and a refractive index equal to either the refractive index of the birefringent material for ordinary light or the index for extraordinary light, said grooves being filled with the material.

20 Claims, 7 Drawing Sheets

POLARIZING BEAM SPLITTER AND OPTICAL HEAD ASSEMBLY

BACKGROUND OF THE INVENTION

1. Field of the Invention

This invention relates to a polarizing beam splitter and an optical pickup assembly using the same.

2. Related Art

Optical devices such as magnetooptical disks are conventionally equipped with a polarizing beam splitter that provides varying diffraction efficiencies with the angle of polarization. Various proposals have been made for the polarizing beam splitter, as described in Unexamined Published Japanese Patent Applications (kokai) Sho 63-262602, Sho 63-26604, Sho 63-314502, etc.

The polarizing beam splitter described in kokai Sho 63-262602 comprises an optically isotropic substrate having a periodic pattern of ridges and grooves to form a grating on a principal surface, with the surface of the grating being covered with a liquid crystal having two principal refractive indices, one of which is equal to the refractive index of said optically isotropic substrate. If the liquid crystal has an index of refraction of ordinary light that is equal to that of said optically isotropic substrate whereas its index of refraction of extraordinary light is different from that of said isotropic substrate, the polarizing beam splitter does not function as a diffraction grating for ordinary light but works as an effective diffraction grating for extraordinary light.

The polarizing beam splitter described in kokai Sho 63-26604 comprises a birefringent medium having ridges and grooves formed in the surface to provide a grating, with at least the grooves being filled with a material having a refractive index substantially equal to the index of the birefringent medium for either ordinary or extraordinary light depending on which light is to be diffracted.

The polarizing beam splitter described in kokai Sho 63-314502 comprises a lithium niobate crystal plate having an optical diffraction grating comprising periodic ion-exchange regions (proton exchange areas) on a principal surface; additionally, in order to cancel the phase change which the ordinary light component passing through the diffraction grating will experience between the ion-exchange regions and the non-ion-exchange regions, a phase compensating dielectric layer is provided, typically on top of the ion-exchange regions, thereby diffracting the extraordinary light.

Problems to be Solved by the Invention

However, the conventional polarizing beam splitters have the following problems of their own.

(1) The refractive index of the liquid crystal has such a large temperature coefficient that its performance is highly dependent on the environment;

(2) The birefringent material formed on the optically isotropic substrate has such a small birefringence that the overall film thickness increases to make the manufacture of a compact system difficult;

(3) Since proton exchange is an isotropically diffusing process, the grating pitch is difficult to control closely and the drop in precision is inevitable;

(4) Apropos of (3) above, the need to locate the phase compensating dielectric grating in registry with the proton-exchange areas which are inherently difficult to be positioned with high precision introduces difficulty in device fabrication;

(5) The problems described under (3) and (4) will also occur in optical devices, such as an optical head assembly, that use the conventional; polarizing beam splitters to deteriorate a signal defecting characteristic; and (6) The need to adjust the refractive index of the filler material to a value substantially equal to the index of the birefringent medium for either ordinary or extraordinary light reduces the latitude in the selection of the filler material, thereby making it difficult to provide a greater freedom in design.

SUMMARY OF THE INVENTION

An object, therefore, of the invention is to provide a polarizing beam splitter that has high environmental resistance, that has uniform characteristics and that yet can be manufactured in a compact form, as well as an optical head assembly using such polarizing beam splitter.

Another object of the invention is to provide a polarizing beam splitter that can be manufactured at a lower cost, as well as an optical head assembly using such beam splitter.

A further object of the invention is to provide a polarizing beam splitter that is easy to manufacture and which yet is improved in precision, as well as an optical head assembly using such beam splitter.

Still another object of the invention is to provide a polarizing beam splitter that permits a filler material to be selected from a sufficiently broad range of choices to assure a greater freedom in design.

According to an aspect of the present invention, there is provided a polarizing beam splitter comprising: an optically isotropic substrate; a layer of birefringent material formed on top of said optically isotropic substrate; and a periodic pattern of ridges and grooves formed on a surface of said optically isotropic substrate to make a grating; and a refractive index equal to either the refractive index of the birefringent material for ordinary light or the index for extraordinary light, said grooves being filled with the material.

According to another aspect of the present invention, there is provided a polarizing beam splitter comprising an optically isotropic substrate; a layer of birefringent material formed on top of said optically isotropic substrate; and a periodic pattern of ridges and grooves formed on said layer of birefringent material, wherein the thickness of the ridges on said layer of birefringent material and the depth of the grooves in said layer being so set that either the phase difference of ordinary light between each of said ridges and grooves or the phase difference of extraordinary light is an even multiple of π.

According to another aspect of the present invention, there is provided a polarizing beam splitter comprising: an optically isotropic substrate; a periodic pattern of ridges and grooves formed on a surface of said optically isotropic substrate to make a grating; and a layer of birefringent material formed at least on the ridges of the grating on said optically isotropic substrate; wherein the thickness of said layer of birefringent material and the depth of the grooves in said substrate being so set that either the phase difference of ordinary light between each of said ridges and grooves or the phase difference of extraordinary light is an even multiple of π.

According to another aspect of the present invention, there is provided polarizing beam splitter comprising: an optically isotropic substrate; a layer of birefringent material formed on said optically isotropic substrate; and a periodic pattern of ridges and grooves formed on a surface of said optically isotropic substrate to form a grating, wherein said grooves being filled with an optically isotropic material that has a refractive index (nc) that satisfies the following relationship with the refractive index of the birefringent material for ordinary light (no) and the index for extraordinary light (he):

$$nc = no + m(no - ne); (m = \pm1, \pm2, \pm3 \ldots)$$
$$= ne + l(no - ne); (l = \pm1, \pm2, \pm3 \ldots)$$

According to another aspect of the present invention, there is provided a polarizing beam splitter comprising: a substrate made of a birefringent material; a layer formed of a different birefringent material on top of said birefringent substrate; and a periodic pattern of ridges and grooves formed on said layer of birefringent material to make a grating, wherein the thickness of the ridges on said layer of birefringent material and the depth of the grooves in said layer being so set that one of the phase difference of ordinary light between each of said ridges and grooves and the phase difference of extraordinary light is an even multiple of π.

According to another aspect of the present invention, there is provided a polarizing beam splitter comprising: a substrate made of a birefringent material; a periodic pattern of ridges and grooves formed on a surface of said substrate to make a grating; and a layer formed of a different birefringent material on at least the ridges of the grating on said birefringent substrate; wherein the thickness of said layer of birefringent material and the depth of the grooves in said substrate being so set that one the phase difference of ordinary light between each of said ridges and grooves and the phase difference of extraordinary light is an even multiple of π.

As will be understood from the foregoing description, the polarizing beam splitter of the invention has the following advantages:

(1) The polydiacetylene film formed on the substrate is inherently small in the temperature dependency of refractive index and, hence, it contributes to enhancement in the environmental resistance of the polarizing beam splitter;

(2) Apropos of (1) above, the polydiacetylene film has inherently high crystallinity and hence contributes to uniformity in the characteristics of the polarizing beam splitter;

(3) Also apropos of (1), the polydiacetylene film causes a great degree of birefringence and, hence, it can be formed in a sufficiently small thickness to realize a compact polarizing beam splitter;

(4) If the substrate is made of an optically isotropic material which is less expensive than birefringent materials, the polarizing beam splitter can be manufactured at a lower cost;

(5) Apropos of (4), optical devices such as an optical head assembly using the polarizing beam splitter can also be manufactured at a lower cost;

(6) The polarizing beam splitter does not use proton exchange areas or a position compensating dielectric grating of the types described in the Prior Art Section and it can be fabricated by making grooves in the diffraction grating and in the substrate simultaneously through a single step of a suitable process such as etching and this contributes to an improvement in positional precision;

(7) Registration can automatically be accomplished by merely filling the grooves with the filler material and this helps provide ease in the fabrication of a polarizing beam splitter; additionally, an optical head assembly using the polarizing beam splitter is not only improved in positional precision but it can also be manufactured with ease;

(8) The polarizing beam splitter may comprise a birefringent substrate that is made of a birefringent material and which has a periodic pattern of ridges and grooves formed on a surface to make a grating and the grooves are filled with an optically isotropic material; additionally, it is designed to satisfy the following relationship between the refractive index of the optically isotropic material (nc), the refractive index of the birefringent material for ordinary light (no) and the index for extraordinary light (ne):

$$nc = no + m(no - ne); (m = \pm1, \pm2, \pm3 \ldots)$$
$$= ne + l(no - ne); (l = \pm1, \pm2, \pm3 \ldots)$$

Since the refractive index of the filler material (nc) needs only to satisfy this equation, the latitude in the selection of filler materials is greater than in the prior art and this contributes to an improvement in the degree of freedom in design.

DETAILED DESCRIPTION OF THE PREFERRED EMBODIMENTS

Figure 9A:
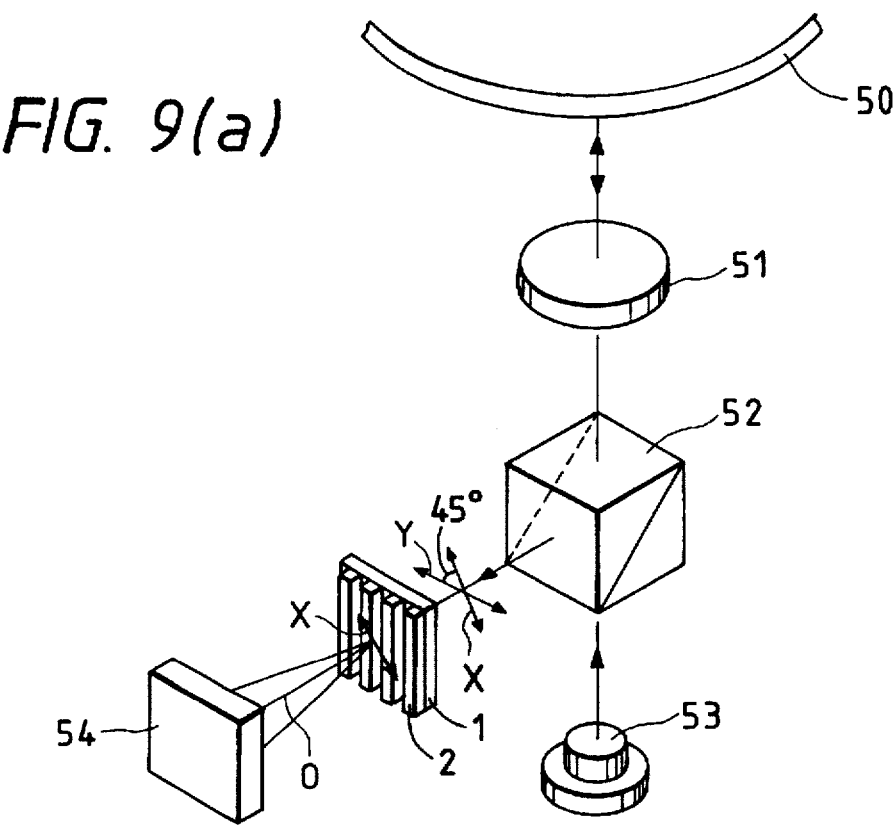
FIGS. 9a and 9b are perspective views showing optical head assemblies incorporating the polarizing beam splitter as constructed in the various examples of the invention.
Figure 9B:
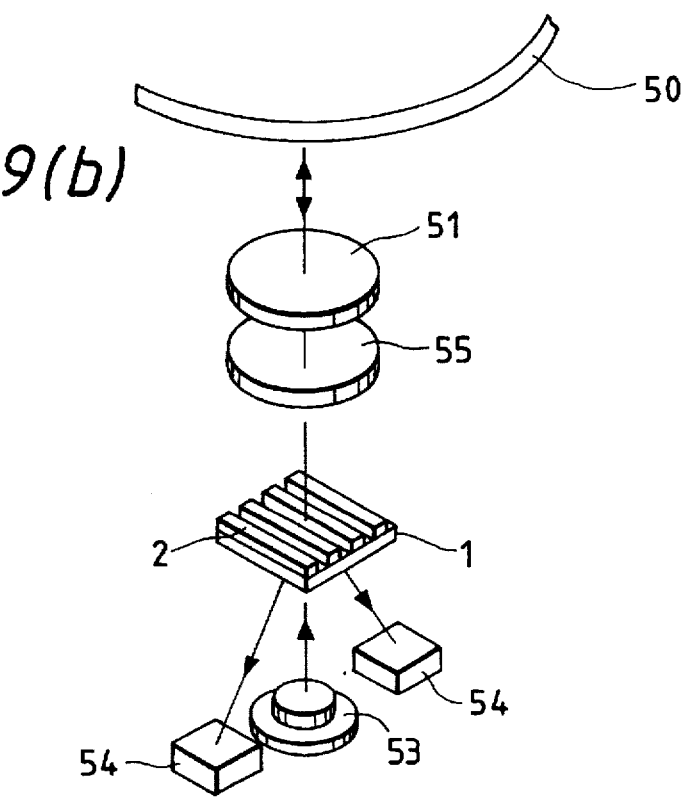

FIG. 9a and 9b show in perspective two optical head assemblies using a polarizing beam splitter according to an example of the invention. The beam splitter shown in FIG. 9 may be any one of the types to be described later in Examples 1–24, which can typically be used for differential detection in optical pickups.

The birefringent material to be used in Examples 1–24 may be exemplified by any materials that can be oriented, such as polydiacetylene, lithium niobate, titanium oxide, quartz, calcite, etc.

The optical head assembly shown in FIG. 9a comprises a light source 53, an objective lens 51 for allowing light rays from the light source 53 to be focused on an information recording medium 50, a beam splitting means 52 for achieving separation between a beamlet travelling from the light source 53 toward the recording medium 50 and a beamlet reflected by the recording medium 50, and an optical detector 54 having a plurality of segments for receiving the reflected beamlet, and the polarizing beam splitter of the invention is provided in the optical path between the beam splitting means 52 and the optical detector 54.

The birefringent material in the polarizing beam splitter has its optical axis X set to be inclined at generally 45° with the direction Y in which the reflected light from the recording medium 50 is to be polarized. Hence, the diffracted and the zero-order component of the reflected light from the recording medium 30 can both be received by the optical detector 54 for differential detection.

The optical head assembly shown in FIG. 9b comprises a light source 53, an objective lens 51 for allowing light rays from the light source 53 to be focused on an information recording medium 50, a quarter wavelength (λ/4) plate 55, and two optical detectors 54 for receiving the light beam reflected from the recording medium 50, and the polarizing beam splitter of the invention is provided in the optical path from the light source 53 to each of the optical detectors 54, with the light beam from the light source 53 being allowed to be launched into the polarizing beam splitter in such a way that the phase difference of light from the light source for each of the ridges and grooves in the splitter is an even multiple of π. Thus, the light travelling in the entrant path is transmitted through the splitter since the phase difference of the light is an even multiple of π whereas the light travelling back in the return path is totally diffracted since the phase difference is an odd multiple of π; the thus processed light components are respectively received by the optical detectors 54.

EXAMPLE 1

Figure 1:
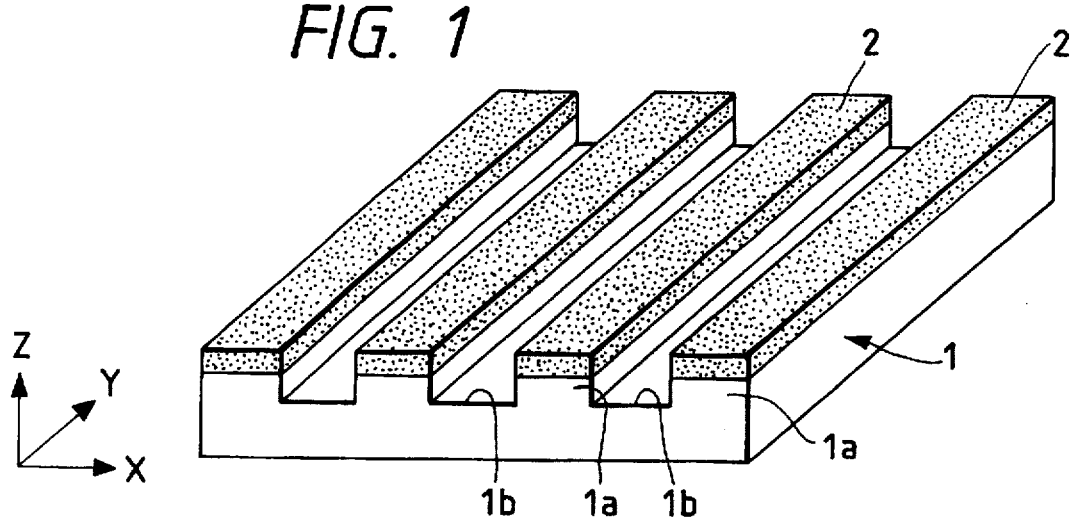
FIG. 1 is a perspective view of a polarizing beam splitter according to Example 1 of the invention.
Figure 2:
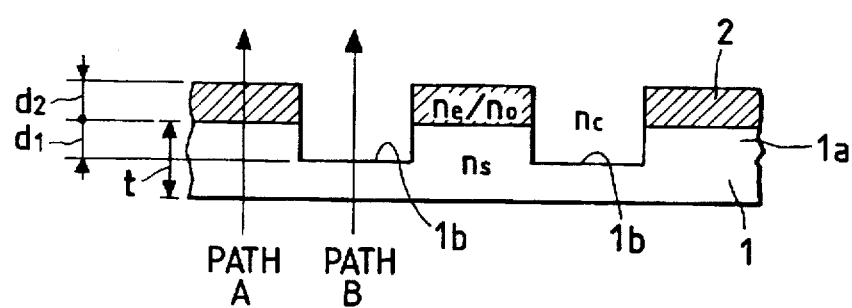
FIG. 2 is a longitudinal section showing commonly the polarizing beam splitters constructed in Examples 1 and 10 of the invention.

Example 1 of the present invention will now be described with reference to drawings. FIG. 1 is a perspective view of a polarizing beam splitter according to Example 1 of the invention, and FIG. 2 is a longitudinal section of the polarizing beam splitter shown in FIG. 1. Referring to FIGS. 1 and 2, an optically isotropic substrate typically made of a glass material is shown by 1. A surface of the glass substrate 1 is provided with a periodic pattern of ridges and grooves to form a grating. Ridges 1a on the surface of the glass substrate 1 are coated with a thin birefringent film 2 which is formed of polydiacetylene represented by the following general formula (1):

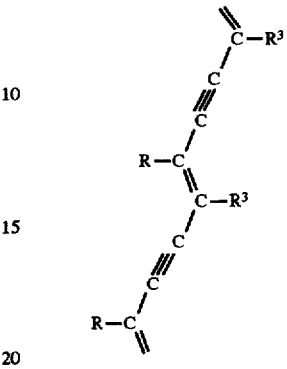

The thin polydiacetylene film 2 can be oriented.

For the purpose of present discussion, take the following assumptions; the ridges 1a on the glass substrate 1 have a thickness of t; the grooves 1b in the glass substrate 1 have a depth of d1; the oriented polydiacetylene film 2 has a thickness of d2; the glass substrate 1 has a refractive index of ns; the oriented polydiacetylene film 2 has refractive indices of no and ne for ordinary and extraordinary lights, respectively; the spaces defined by the ridges 1a, grooves 1b and the oriented polydiacetylene film 2 have a refractive index of nc; light has a wavelength of λ; and k=2π/λ.

Ordinary light passing through the polarizing beam splitter in region A (see FIG. 2) where the oriented polydiacetylene film 2 is formed has a phase as expressed by:

$$\{ns \cdot t + no \cdot d2\}k \tag{1}$$

Ordinary light passing through the polarizing beam splitter in region (B) (also see FIG. 2) where the oriented polydiacetylene film 2 is not formed has a phase as expressed by:

$$\{ns(t-d1)+ns(d1+d2)\}k \tag{2}$$

Therefore, the phase difference of ordinary light, OPD(o), is calculated by subtracting Eq. 2 from Eq. 1 and expressed by:

$$OPD(o)=\{(ns-nc)d1+(no-nc)d2\}k \tag{3}$$

On the other hand, extraordinary light passing through region A has a phase as expressed by:

$$\{ns \cdot t + ne \cdot d2\}k \tag{4}$$

Extraordinary light passing through region B has a phase as expressed by Eq. 2. Hence, the phase difference of extraordinary light, OPD(e), is calculated by subtracting Eq. 2 from Eq. 4 and expressed by:

$$OPD(e)=\{(ns-nc)d1+(ne-nc)d2\}k \tag{5}$$

In the present discussion, the spaces defined by the ridges 1a, grooves 1b and the oriented polydiacetylene film are assumed to be filled with air and, hence, nc=1.

In order to insure that extraordinary light will not diffract, one need allow Eq. 5 to assume even multiples of and, hence:

$$OPD(e) = \{(ns-nc)d1 + (ne-nc)d2\}k \quad (6)$$
$$= 2p\pi \ (p = 0, \pm 1, \pm 2 \ldots)$$

Additionally, in order to insure that ordinary light will not diffract, one need allow Eq.3 to assume even multiples of $\pi$ and, hence:

$$OPD(o) = \{(ns-nc)d1 + (no-nc)d2\}k \quad (7)$$
$$= 2p\pi \ (p = 0, \pm 1, \pm 2 \ldots)$$

Under these two conditions, both ordinary and extraordinary lights may contain an undiffracted component depending on the settings of d1 and d2. The polarizing beam splitter of Example 1 is typically used in a pickup on an optical disk system. In such application, it is desirable that either one of ordinary and extraordinary lights be totally diffracted while the other is not diffracted at all. To this end, one need to insure that not only Eq. 6 but also the following equation holds:

$$OPD(o) = \{(ns-nc)d1 + (no-nc)d2\}k \quad (8)$$
$$= (2q+1)\pi \ (q = 0, \pm 1, \pm 2 \ldots)$$

Alternatively, one need to insure that not only Eq. 7 but also the following equation holds:

$$OPD(e) = \{(ns-nc)d1 + (ne-nc)d2\}k \quad (9)$$
$$= (2q+1)\pi \ (q = 0, \pm 1, \pm 2 \ldots)$$

In this case, one can determine the value of d2, or the thickness of the oriented polydiacetylene film 2, in such a way that the following equation obtained by subtracting Eq. 6 from Eq. 8 and Eq. 9 from Eq. 7 will hold:

$$[OPD(o) - OPD(e)] = (no-ne)d2 \cdot k \quad (10)$$
$$= (2j+1)\pi \ (j = 0, \pm 1, \pm 2)$$

Hence, d2=$\pi$(2j+1)/[k·|no−ne|], indicating that d2 is dependent on the difference between no and ne, two refractive indices of the oriented polydiacetylene film 2. Stated more specifically, the absolute value of no−ne should be increased to reduce d2.

If d2, the thickness of the oriented polydiacetylene film 2, and d1, the depth of the grooves in the glass substrate 1, are set in such a way that either Eq. 6 or 7 is satisfied, the polarizing beam splitter under consideration will effectively function as a diffraction grating to insure that either ordinary or extraordinary is light is prevented from diffracting.

Thus, the polarizing beam splitter of Example 1 comprises the glass substrate 1 which is an optically isotropic substrate having a periodic pattern of ridges and grooves formed on a surface to define a grating, with the ridges 1a on the glass substrate 1 being coated with the polydiacetylene film 2 which is oriented in the plane of a principal surface of the glass substrate 1 and which works as a birefringent material layer. The values of d2, the thickness of the oriented polydiacetylene film 2 and d1, the depth of the grooves in the substrate 1 are so set that either OPD(o), the phase difference of ordinary light, or OPD(e), the phase difference of extraordinary light, between region A (ridge 1a) and region B (groove 1b), will assume even multiples of $\pi$. Because of this arrangement, the polarizing beam splitter is capable of preforming the intended function as described above. The oriented polydiacetylene film 2 is inherently small in the temperature dependency of refractive index and, hence, it contributes to enhancement in the environmental resistance of the polarizing beam splitter. The oriented polydiacetylene film 2 also has inherently high crystallinity and hence contributes to uniformity in the characteristics of the polarizing beam splitter. Another feature of the oriented polydiacetylene film 2 is its ability to cause a great degree of birefringence and, hence, it can be formed in a sufficiently small thickness to realize a compact polarizing beam splitter.

Fabrication Processes

The first process for fabricating the polarizing beam splitter of Example 1 will now be described.

The process starts with forming a monomeric diacetylene film of a thickness of about 100Å over the glass substrate 1 of a given thickness t by a suitable method such as vacuum evaporation; subsequently, the deposited monomeric diacetylene film is polymerized by exposure to a uv radiation in air to form the polymer of diacetylene.

In the second step, the thus formed polydiacetylene film is rubbed in one direction by a suitable means such as a silicone cloth, whereupon the polydiacetylene film is oriented in the rubbing direction.

In the third step, the rubbed polydiacetylene film is overlaid with another layer of polydiacetylene by the same method as in the first step until the combined thickness of the polydiacetylene films reaches a predetermined value d2. Stated more specifically, a monomeric diacetylene film is superposed and polymerized by exposure to a uv radiation in air to form the polymer of diacetylene. The thus formed polydiacetylene film will be oriented by rubbing in the same direction as in the second step.

In the fourth step, a resist for forming a grating consisting of ridges and grooves is applied onto the polydiacetylene film, exposed to light, developed and etched until the depth of the grooves 1b in the glass substrate 1 reaches a predetermined value d1. The sequence of procedures taken in the fourth step is a known, simple technique that is commonly adopted in the process of semiconductor fabrication. As a result of these procedures, a polarizing beam splitter of the configuration shown in FIGS. 1 and 2 is fabricated.

Thus, according to this fabrication process, the polydiacetylene film can be provided with in-plane orientation by merely rubbing the film in one direction; in addition, not only the polydiacetylene film but also the grating consisting of ridges and grooves can be formed easily. These contribute to easy fabrication of the polarizing beam spitter shown in FIGS. 1 and 2.

Other processes that can be employed to fabricate the polarizing beam splitter of Example 1 are described below.

The second process comprises the steps of:

i) evaporating a monomeric diacetylene film onto an optically isotropic substrate 1 and converting it to a polymer;

ii) rubbing the resulting polydiacetylene film in one direction so that it is oriented in that direction;

iii) evaporating another layer of diacetylene monomer onto the rubbed polydiacetylene film until a predetermined combined film thickness is reached and then converted to a polymer; and iv) illuminating the resulting polydiacetylene film with light from a light source having a wavelength corresponding to the absorption wavelength of polydiacetylene, whereby the refractive index of the polydiacetylene film is varied periodically to produce a polarizing beam splitter.

Periodic differences in refractive index can alternatively be imparted by changing the refractive index of the polydiacetylene film with interference fringes produced by a two-beam interference method using light from a coherent light source.

The third process comprises the steps of:

i) evaporating a monomeric diacetylene film onto an optically isotropic substrate 1 and converting it to a polymer;

ii) rubbing the resulting polydiacetylene film in one direction so that it is oriented in that direction;

iii) evaporating another layer of diacetylene monomer onto the rubbed polydiacetylene film until a predetermined combined film thickness is reached and then converted to a polymer; and iv) illuminating the resulting polydiacetylene film with light from a light source having a wavelength corresponding to the absorption wavelength of polydiacetylene, whereby the volume (thickness) of the polydiacetylene film is varied periodically to produce a polarizing beam splitter.

Periodic variations in volume can alternatively be imparted by changing the volume of the polydiacetylene film with interference fringes produced by a two-beam interference method using light from a coherent light source.

The forth process comprises the steps of:

i) evaporating a monomeric diacetylene film onto an optically isotropic substrate 1 and converting it to a polymer;

ii) rubbing the resulting polydiacetylene film in one direction so that it is oriented in that direction;

iii) evaporating another layer of diacetylene monomer onto the rubbed polydiacetylene film until a predetermined combined film thickness is reached and then converted to a polymer;

iv) illuminating the resulting polydiacetylene film with light from a light source having a wavelength corresponding to the absorption wavelength of polydiacetylene, whereby the solubility of the polydiacetylene film is varied periodically; and v) treating the polydiacetylene film with a suitable solvent so that the more soluble areas of the film the solubility of which varies periodically are removed to fabricate a polarizing beam splitter.

The fifth process is the same as the first to the fourth process, except that the optically isotropic substrate 1 is replaced by a substrate of anisotropic single crystal such as sapphire (which may be a birefringent substrate), by so doing, the evaporated diacetylene film can be oriented spontaneously in a direction parallel to the crystal axis of the substrate and a polarizing beam splitter can be fabricated without the rubbing step.

The sixth process is the same as the first to the fourth process, except that the optically isotropic substrate 1 is overlaid with a film layer from a material other than diacetylene; by so doing, the evaporated diacetylene film can be oriented spontaneously in a direction parallel to the orientation of the film layer and a polarizing beam splitter can be fabricated without the rubbing step.

EXAMPLE 2

Figure 3:
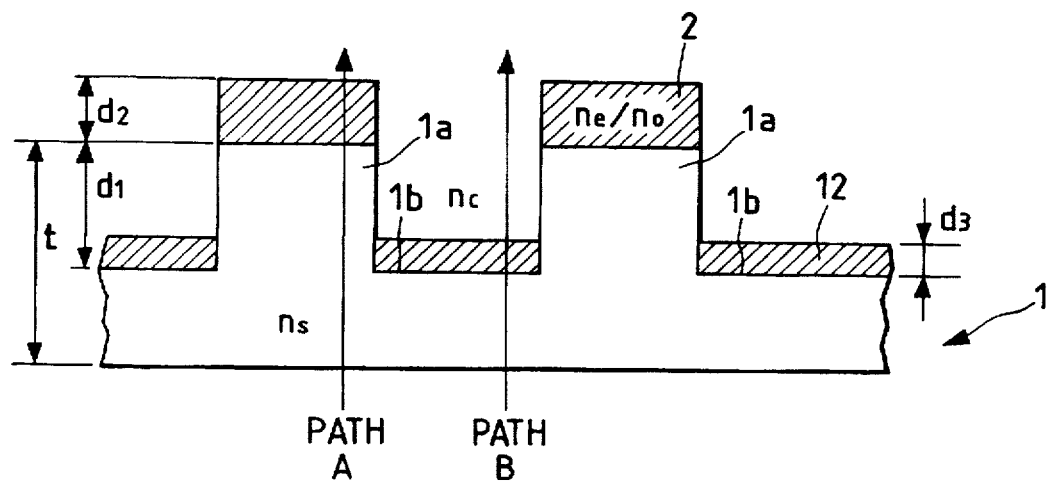
FIG. 3 is a longitudinal section showing commonly the polarizing beam splitters constructed in Examples 2 and 11 of the invention.

FIG. 3 is a longitudinal section of a polarizing beam splitter according to Example 2 of the invention. The polarizing beam splitter of Example 2 differs from that of Example 1 in that an oriented polydiacetylene film 12 with a thickness of d3 is additionally formed in the grooves 1$b$ of the predetermined depth d1 in the glass substrate 1. It should be noted that not only the polarizing beam splitter of Example 2 but also those of the examples which will be described hereinafter can be fabricated by suitable methods selected from among the first to the sixth processes described above.

Ordinary light passing through region A (see FIG. 3) has a phase as expressed by:

$$\{ns \cdot t + no \cdot d2\}k \qquad (1)$$

Ordinary light passing through region (B) (also see FIG. 3) has a phase as expressed by:

$$\{ns(t-d1) + no \cdot d3 + nc(d1+d2-d3)\}k \qquad (11)$$

Therefore, the phase difference of ordinary light, OPD(o), is calculated by subtracting Eq. 11 from Eq. 1 and expressed by:

$$OPD(o) = \{(d2-d3)no + ns \cdot d1 - nc(d1+d2-d3)\}k \qquad (12)$$

On the other hand, extraordinary light passing through region A has a phase as expressed by:

$$\{ns \cdot t + ne \cdot d2\}k \qquad (4)$$

Extraordinary light passing through region B has a phase as expressed by:

$$\{ns(t-d1) + ne \cdot d3 + nc(d1+d2-d3)\}k \qquad (13)$$

Therefore, the phase difference of ordinary light, OPD(e), is calculated by subtracting Eq. 13 from Eq. 4 and expressed by:

$$OPD(e) = \{(d2-d3)ne + ns \cdot d1 - nc(d1+d2-d3)\}k \qquad (14)$$

In the present discussion, nc=1.

In order to insure that extraordinary light will not diffract, one need allow Eq. 14 to assume even multiples of $\pi$ and, hence:

$$\begin{aligned} OPD(e) &= \{(d2-d3)ne + ns \cdot d1 - nc(d1+d2-d3)\}k \\ &= 2p\pi \, (p=0, \pm 1, \pm 2 \ldots) \end{aligned} \qquad (15)$$

Additionally, in order to insure that ordinary light will not diffract, one need allow Eq. 12 to assume even multiples of $\pi$ and, hence:

$$\begin{aligned} OPD(o) &= \{(d2-d3)no + ns \cdot d1 - nc(d1+d2-d3)\}k \\ &= 2p\pi \, (p=0, \pm 1, \pm 2 \ldots) \end{aligned} \qquad (16)$$

Under these two conditions, both ordinary and extraordinary lights may contain an undiffracted component depending on the settings of d1, d2 and d3. The polarizing beam splitter of Example 2 is typically used in a pickup on an optical disk system. In such applications, it is desirable that either one of ordinary and extraordinary lights be totally diffracted while the other is not diffracted at all. To this end, one needs to insure that not only Eq. 15 but also the following equation holds:

$$OPD(o) = \{(d2-d3)no + ns \cdot d1 - nc(d1+d2-d3)\}k \qquad (17)$$
$$= (2q-1)\pi \, (q=0,\pm 1,\pm 2 \ldots)$$

Alternatively, one needs to insure that not only Eq. 16 but also the following equation holds:

$$OPD(e) = \{(d2-d3)ne + ns \cdot d1 - nc(d1+d2-d3)\}k \qquad (18)$$
$$= (2q+1)\pi \, (q=0,\pm 1,\pm 2 \ldots)$$

In this case, one can determine the values of d2 and d3, or the thicknesses of the oriented polydiacetylene films 2 and 12, respectively, in such a way that the following equation obtained by subtracting Eq. 15 from Eq. 17 and Eq. 18 from Eq. 16 will hold:

$$[OPD(o) - OPD(e)] = (no-ne) \cdot (d2-d3)k \qquad (19)$$
$$= (2j+1)\pi \, (j=0,\pm 1,\pm 2)$$

If d2 and d3, the thicknesses of the oriented polydiacetylene films 2 and 12, respectively, and d1, the depth of the grooves in the glass substrate 1, are set in such a way that either Eq. 15 or 16 is satisfied, the polarizing beam splitter under consideration will effectively function as a diffraction grating to insure that either ordinary or extraordinary light is prevented from diffracting.

If d2=d3, Eq. 19 becomes zero and, hence, this condition is excluded from the applicable scope of the invention.

Of course, the polarizing beam splitter of Example 2 which is constructed in the manner described above can achieve the same result as the beam splitter of Example 1.

It should also be noted that the film on the ridges 1a may be formed of a different birefringent material than the film deposited in the grooves 1b. Even in this case, the calculations descried above will apply equally.

EXAMPLE 3

Figure 4:
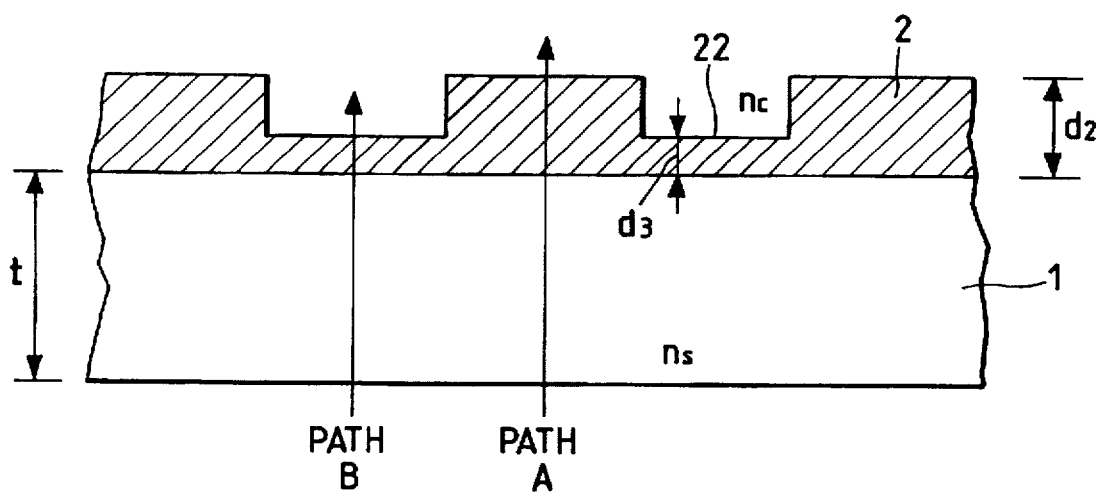
FIG. 4 is a longitudinal section showing commonly the polarizing beam splitters constructed in Examples 3 and 12 of the invention.

FIG. 4 is a longitudinal section of a polarizing beam splitter according to Example 3 of the invention. The polarizing beam splitter of Example 3 differs from that of Example 1 in that an oriented polydiacetylene film 2 of the greater thickness is formed alternately with an oriented polydiacetylene film 22 of the smaller thickness on a flat glass substrate 1. The alternating oriented polydiacetylene films 2 and 22 can be formed by modifying the fourth step 4 of the fabrication process in Example 1 in such a way that when forming grooves in the polydiacetylene film, it is etched to have the polydiacetylene film 22 remain intact in a predetermined thickness of d3 on the glass substrate 1 whereas the grooves are filled with an isotropic medium having a refractive index of nc.

In Example 3, calculations can be made by the same procedure as in Examples 1 and 2, resulting in:

$$OPD(o) = (d2-d3) \cdot (no-nc) \cdot k \qquad (20)$$

$$OPD(e) = (d2-d3) \cdot (ne-nc) \cdot k \qquad (21)$$

In the present discussion, nc=1.

Therefore, in order to insure that ordinary light will not diffract, one need satisfy the following condition:

$$OPD(o) = (d2-d3) \cdot (no-ne) \cdot k \qquad (22)$$
$$= 2q\pi \, (q=0,1,2 \ldots)$$

Additionally, in order to insure that extraordinary light will not diffract, one need to satisfy the following condition:

$$OPD(e) = (d2-d3) \cdot (ne-nc) \cdot k \qquad (23)$$
$$= 2q\pi \, (q=0,1,2 \ldots)$$

If d2, the thickness of the oriented polydiacetylene film 2, d3, the thickness of the oriented polydiacetylene film 22, and nc, the refractive index of that film, are set in such a way that either Eq. 22 or 23 is satisfied, the polarizing beam splitter under consideration will insure that either ordinary or extraordinary light is prevented from diffracting.

Needless to say, the thus constructed polarizing beam splitter of Example 3 can achieve the same result as the beam splitters of Examples 1 and 2.

It should be added that the beam splitter shown in FIG. 4 may be modified in such a way that d3, or the thickness of the oriented polydiacetylene film 22, is nil. The medium having the refractive index nc is not necessarily air but may be any isotropic material.

EXAMPLE 4

Figure 5:
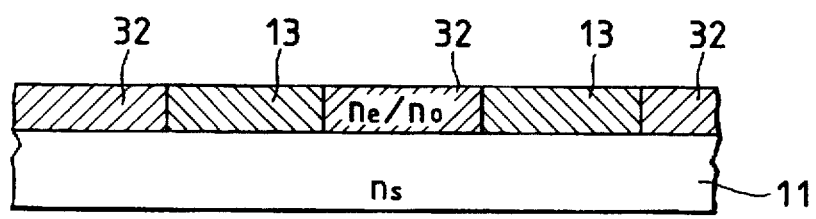
FIG. 5 is a longitudinal section showing commonly the polarizing beam splitters constructed in Examples 4 and 8 of the invention.

FIG. 5 is a longitudinal section of a polarizing beam splitter according to Example 4 of the invention. Referring to FIG. 5, an optically isotropic substrate is shown by 11. A surface of this substrate 11 is overlaid with an oriented polydiacetylene film 32 of the same characteristics as described above. This oriented polydiacetylene film is provided with a grating consisting of a periodic pattern of ridges and grooves and the grooves are sufficiently deep so their bottoms reach the surface of the substrate 11. The grooves in the oriented polydiacetylene film 32, or the regions defined by lateral sides of adjacent ridges of the oriented polydiacetylene film 32 and the surface of the substrate 11, are filled with a material 13 having a refractive index nc equal to ne, or the refractive index of the oriented polydiacetylene film 32 for extraordinary light. Because of this arrangement, the oriented polydiacetylene film 32 will not create a refractive index difference under extraordinary light and, hence, no diffracted component will be produced. On the other hand, the film 32 will create an index difference under ordinary light and, hence, it will work as a phase grating to produce a diffracted component.

Thus, the product of Example 4 will function as a polarizing beam splitter and, in addition, the oriented polydiacetylene film 32 which is inherently small in the temperature dependency of refractive index contributes to enhance the environmental resistance of the polarizing be an splitter. The oriented polydiacetylene film 32 also has inherently high crystallinity and hence contributes to uniformity in the characteristics of the polarizing beam splitter. Another feature of the oriented polydiacetylene film 32 is its ability to cause a great degree of birefringence and, hence, it can be formed in a sufficiently small thickness to realize a compact polarizing beam splitter.

EXAMPLE 5

Figure 6:
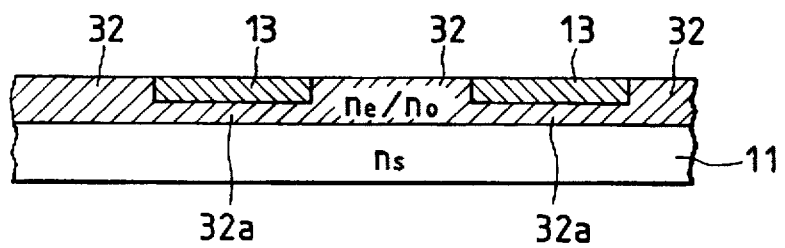
FIG. 6 is a longitudinal section showing commonly the polarizing beam splitters constructed in Examples 5 and 9 of the invention.

FIG. 6 is a longitudinal section of a polarizing beam splitter according to Example 5 of the invention. The polarizing beam splitter of Example 5 differs from that of Example 4 in that the grooves in the oriented polydiacetylene film 32 are not so deep as to have their bottoms reach the surface of the substrate 11 but that a certain thickness of the film 32 is maintained under the grooves. The regions of the oriented polydiacetylene film 32 that are defined by the bottoms of the remaining areas 32a and lateral sides of adjacent ridges of the oriented polydiacetylene film 32 are filled with a material 13 of the same kind as used in Example 4.

Of course, the thus constructed polarizing beam splitter of Example 5 can operate to achieve the same result as the beam splitter of Example 4.

In Examples 4 and 5, the grooves in the oriented polydiacetylene film 32 are filled with the material 13 having the refractive index nc equal to he, or the refractive index of the film 32 for extraordinary light. This, however, is not the sole case of the invention and the grooves may be filled with a material having a refractive index equal to no, or the refractive index of the film 32 for ordinary light. In this alternative case, the oriented polydiacetylene film 32 will create a refractive index difference with respect to extraordinary light and, hence, will work as a phase grating to produce a diffracted component; however, in the absence of any index difference, the film 32 will not diffract ordinary light.

The polarizing beam splitter shown in FIG. 2 comprises the optically isotropic substrate 1 having a periodic pattern of ridges and grooves formed on a surface to define a grating, with the ridges on the substrate 1 being coated with the oriented polydiacetylene film 2 and, additionally, the spaces defined by the ridges and grooves in the substrate 1 and the oriented polydiacetylene film 2 are filled with a material having a refractive index equal to either the refractive index of the film for ordinary light or the index for extraordinary light. Even with this polarizing beam splitter, one may set the thickness of the film 2 and the depth of grooves 1b in the substrate 1 in such a way as to satisfy Eq. 10 and Eq. 8 or 9 and this allows either ordinary or extraordinary light to be diffracted as effectively as in Examples 4 and 5.

EXAMPLE 6

Figure 7:
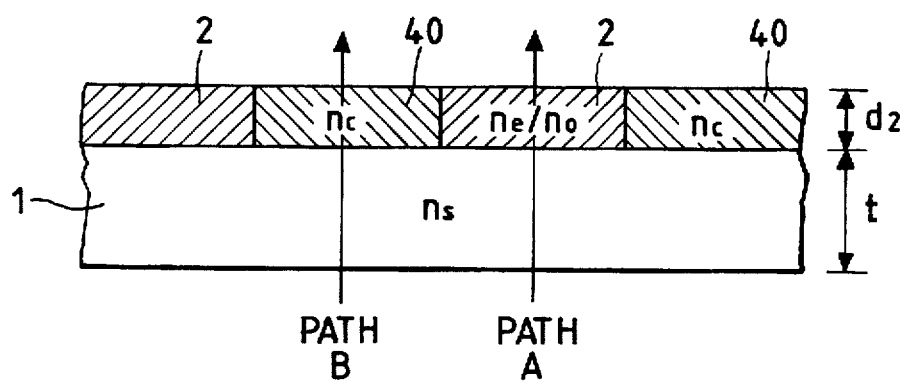
FIG. 7 is a longitudinal section showing commonly the polarizing beam splitters constructed in Examples 6 and 16 of the invention.

FIG. 7 is a longitudinal section of a polarizing beam splitter according to Example 6 of the invention. Referring to FIG. 7, an optically isotropic substrate typically made of a glass material is shown by 1. A surface of the glass substrate 1 is provided with an oriented polydiacetylene film 2. The oriented polydiacetylene film 2 is provided with a periodic pattern of ridges and grooves to form a grating. The grooves in the film 2 are sufficiently deep so their bottoms reach the surface of the glass substrate 1. The grooves in the film 2, or the regions defined by lateral sides of adjacent ridges of the film 2 and the surface of the glass substrate 1, are filled with a filler material 40 (but not materials that have refractive indices generally equal to no, or the refractive index of the film 2 with respect to ordinary light, or he, the index for extraordinary light). The relationship that holds between nc (the refractive index of the filler material 40), no and ne is expressed by the following equation:

$$nc = no + m(no - ne); (m = \pm 1, \pm 2, \pm 3 \ldots)$$
$$= ne + l(no - ne); (l = \pm 1, \pm 2, \pm 3 \ldots)$$

For the present discussion, take the following assumptions: the glass substrate has a thickness of t; the oriented polydiacetylene film 2 has a thickness of d2; the glass substrate 1 has a refractive index of ns; the oriented polydiacetylene film 2 has a refractive index of no with respect to ordinary light; the film 2 has a refractive index of ne with respect to extraordinary light; the filler material 40 has a refractive index of nc; light has a wavelength of λ; and k=λ/2π.

Then, ordinary light passing through region A has a phase as expressed by:

$$\{ns \cdot t + no \cdot d2\} \cdot k \tag{24}$$

Ordinary light passing through region B has a phase as expressed by:

$$\{ns \cdot t + nc \cdot d2\} k \tag{25}$$

Hence, OPD(o), or the phase difference of ordinary light between regions A and B, is calculated by subtracting Eq. 25 from Eq. 24 and expressed by:

$$OPD(o) = (no - nc) \cdot d2 \cdot k \tag{26}$$

On the other hand, extraordinary light passing though region A has a phase as expressed by:

$$(ns \cdot t + ne \cdot d2) \cdot k \tag{27}$$

The phase of extraordinary light passing through region B is expressed by Eq. 25.

Hence, OPD(e), or the phase difference of extraordinary light between regions A and B, is calculated by subtracting Eq. 25 from Eq. 27 and expressed by:

$$OPD(e) = (ne - nc) \cdot d2 \cdot k \tag{28}$$

In the present discussion, nc=no+m(no−ne) where m is an integer) and nc=ne+l(no−ne) where l is an integer).

Hence, Eq. 26 for the phase difference of ordinary light can be rewritten as:

$$OPD(o) = -m(no - ne) \cdot d2 \cdot k$$

Similarly, Eq. 28 for the phase difference of extraordinary light can be rewritten as:

$$OPD(e) = -l(no - ne) \cdot d2 \cdot k$$

In order to insure that either ordinary or extraordinary light is prevented from diffracting, one needs to determine d2 in such a way as to satisfy either one of the following conditions:

$$OPD(o) = -m(no - ne) \cdot d2 \cdot k$$
$$= 2p\pi \ (p = \pm 1, \pm 2, \pm 3 \ldots)$$
$$OPD(e) = -l(no - ne) \cdot d2 \cdot k$$
$$= 2p\pi \ (p = \pm 1, \pm 2, \pm 3 \ldots)$$

In Example 6, it is also desirable that either ordinary or extraordinary light should not be diffracted while the other is totally diffracted. To this end, it is necessary to satisfy the additional condition that the difference between OPD(o) and OPD(e) assume odd multiples of π, which is expressed by:

$$OPD(o) - OPD(e) = (l - m)(no - ne) \cdot d2 \cdot k$$
$$= (2i + l)(i = 0, \pm 1, \pm 2 \ldots)$$

Taking the difference between the two equations for nc, $$no - ne + (m - l)(no - ne) = 0$$

which means l−m=1. Hence, d2 can be determined as follows:

$$d2 = \pi(2i + 1)/[k \cdot |no - ne|]$$
$$= (\lambda/2)(2i + 1)/|no - ne|.$$

Thus, in Example 6, the glass substrate 1 serving as the optically isotropic substrate is overlaid with the oriented polydiacetylene film 2 which, in turn, is overlaid with the periodic pattern of ridges and grooves to form a grating on the surface, and the grooves are filled with the filler material 40 (excluding materials that have refractive indices generally equal to no, or the refractive index of the film 2 with respect to ordinary light, or he, the index for extraordinary light). Additionally, nc (the refractive index of the filler material 40), no and ne are adjusted to satisfy the following relation:

$$nc = no + m(no - ne); (m = \pm 1, \pm 2, \pm 3 \ldots)$$
$$= ne + l(no - ne); (l = \pm 1, \pm 2, \pm 3 \ldots)$$

Thus, the polarizing beam splitter of Example 6 is capable of performing the intended function as described above. Since the oriented polydiacetylene film 2 is inherently small in the temperature dependency of refractive index, it contributes to enhancement in the environmental resistance of the polarizing beam splitter. The oriented polydiacetylene film 2 also has inherently high crystallinity and, hence, contributes to uniformity in the characteristics of the polarizing beam splitter. Another feature of the oriented polydiacetylene film 2 is its ability to cause a great degree of birefringence and, hence, it can be formed in a sufficiently small thickness to realize a compact polarizing beam splitter.

EXAMPLE 7

Figure 8:
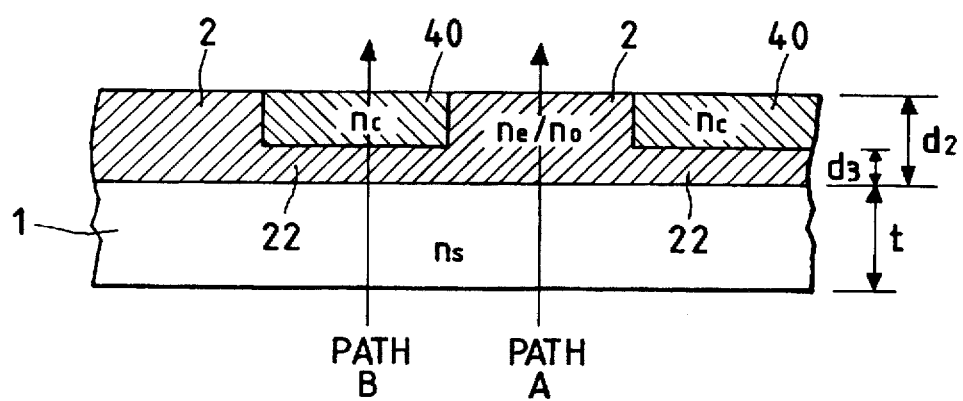
FIG. 8 is a longitudinal section showing commonly the polarizing beam splitters constructed in Examples 7 and 17 of the invention.

FIG. 8 is a longitudinal section of a polarizing beam splitter according to Example 7 of the invention. The polarizing beam splitter of Example 7 differs from that of Example 6 in that the grooves in the oriented polydiacetylene film 2 are not so deep as to have their bottoms reach the surface of the glass substrate 1 but that a certain thickness of the film 2 is maintained under the grooves. The regions of the oriented polydiacetylene film 2 that are defined by the bottoms of the remaining areas 22 and lateral sides of adjacent ridges of the oriented polydiacetylene film 2 are filled with a material 40 of the same kind as used in Example 6.

Even with this design, the calculations performed in Example 6 will apply and either OPD(o) or OPD(e) can be rendered to assume even multiples of π, thereby insuring that either one of ordinary and extraordinary lights is prevented from diffracting while the other is allowed to diffract and, hence, the polarizing beam splitter of Example 8 can operate to achieve the same result as the beam splitter of Example 6.

The polarizing beam splitter shown in FIG. 2 comprises the optically isotropic substrate 1 having a periodic pattern of ridges and grooves formed on a surface to define a grating, with the ridges on the substrate 1 being coated with the oriented polydiacetylene film 2 and, additionally, the spaces defined by the ridges and grooves in the substrate 1 and the oriented polydiacetylene film 2 are filled with the material 40 (excluding materials that have refractive indices generally equal to no, or the refractive index of the film 2 with respect to ordinary light, or ne, the index for extraordinary light) and, what is more, the device is so designed that the relationship expressed by the following equation will hold between nc (the refractive index of the filler material 40), no and ne:

$$nc = no + m(no - ne); (m = \pm 1, \pm 2, \pm 3 \ldots)$$
$$= ne + l(no - ne); (l = \pm 1, \pm 2, \pm 3 \ldots)$$

Even with this polarizing beam splitter, one may set the thickness of the oriented polydiacetylene film 2 and the depth of grooves b in the substrate 1 in such a way as to satisfy Eq. 10 and Eq. 8 or 9 and this enables the beam splitter to operate and achieve the same result as the devices of the previous examples.

While the present invention has been described above with specific reference to Examples 1–7, it should be understood that the invention is by no means limited to those examples only and that it may be modified in various ways by, for example, providing an anti-reflection coat on either the obverse or reverse surface or both surfaces of the polarizing beam splitter with a view to improving its diffraction efficiency. It should also be noted that in Examples 1–7, the polydiacetylene film is oriented in the principal surface, or X-Y plane, but this should not be taken as the sole case of the invention.

EXAMPLE 8

Example 8 of the invention will now be described with reference to accompanying drawings. The polarizing beam splitter of Example 8 has substantially the same construction a that of Example 4 which is shown in FIG. 5. The polarizing beam splitter of Example 8 differs from that of Example 4 in that quartz rather than the oriented polydiacetylene film is formed as the layer of birefringent material. Hence, the following description of the polarizing beam splitter of Example 8 is based on FIG. 5 which is the longitudinal section used to explain Example 4.

Referring to FIG. 5, an optically isotropic glass substrate which is generally indicated by 11 is typically made of soda-lime glass having a refractive index (ns) of 1.51. A surface of the glass substrate 11 is provided with the layer of birefringent material such as quartz 32. The quartz 32 is provided with a periodic pattern of ridges and grooves to form a grating. The grooves in the quartz 32 are sufficiently deep so their bottoms reach the surface of the glass substrate 11.

The quartz 32 has a refractive index (no) of 1.52 with respect to ordinary light and an index (ne) of 1.48 with respect to extraordinary light. The grooves in the quartz 32, or the regions defined by lateral sides of adjacent ridges on the quartz 32 and the surface of the glass substrate 11, are filled with a material 13 such as an acrylic resin that has a refractive index (nc) of 1.48 which is equal to the index (ne) of the quartz 32 with respect to extraordinary light. Because of this arrangement, the quartz 32 will not create a refractive index difference for extraordinary light and, hence, no diffracted component will be produced. On the other hand, the quartz 32 works as a phase grating with an index difference of 0.04 under ordinary light and produces a diffracted component.

Thus, the product of Example 8 comprises the glass substrate 11 as the optically isotropic substrate, which is overlaid with the quartz 32 as the layer of birefringent material; the quartz 32 in turn is provided with a periodic pattern of ridges and grooves to form a grating and the grooves in the quartz 32 are filled with the acrylic resin 13 as a filler material having a refractive index equal to the index of the quartz 32 with respect to extraordinary light. Because of these structural features, the polarizing beam splitter of Example 8 can perform its intended function.

Since the optically isotropic substrate 11 is less expensive than the substrate made of a birefringent material, it enables the polarizing beam splitter of Example 8 to be manufactured at a lowest cost.

EXAMPLE 9

Example 9 of the invention will now be described with reference to accompanying drawings. The polarizing beam splitter of Example 9 has substantially the same construction as that of Example 5 which is shown in FIG. 6. The polarizing beam splitter of Example 9 differs from that of Example 5 in that quartz rather than the oriented polydiacetylene film is formed as the layer of birefringent material. Hence, the following description of the polarizing beam splitter of Example 9 is based on FIG. 6 which is the longitudinal section used to explain Example 5.

The polarizing beam splitter of Example 9 also differs from that of Example 8 in that the grooves in quartz 32 are not so deep as to have their bottoms reach the surface of the glass substrate 11 but that a certain thickness of the quartz 32 is maintained under the grooves. The regions of the quartz 32 that are defined by the bottoms of the remaining areas 32a and lateral sides of adjacent ridges on the quartz 32 are filled with an acrylic resin 13 of the same kind as used in Example 8. Of course, the thus constructed polarizing beam splitter of Example 9 can operate to achieve the same result as the beam splitter of Example 8.

In both Examples 8 and 9, the grooves in the quartz 32 are filled with the acrylic resin 13 having the refractive index (no) of 1.48 which is equal to the refractive index (ne) of the quartz 32 with respect to extraordinary light. If desired, the grooves in the quartz 32 may be filled with a material having an nc value of 1.52 which is equal to the refractive index (no) of the quartz 32 with respect to ordinary light. In this case, the quartz 32 will work as a phase grating with a refractive index difference of 0.04 under extraordinary light and produces a diffracted component; on the other hand, the quartz 32 will not create an index difference under ordinary light and, hence, no diffracted component will be produced.

EXAMPLE 10

Example 10 of the invention will now be described with reference to accompanying drawings. The polarizing beam splitter of Example 10 has substantially the same construction as that of Example 1 which is shown in FIG. 2. The polarizing beam splitter of Example 10 differs from that of Example 1 in that a lithium niobate film rather than the oriented polydiacetylene film is formed as the layer of birefringent material. Hence, the following description of the polarizing beam splitter of Example 10 is based on FIG. 2 which is the longitudinal section used to explain Example 1.

If, as in Example 1, the thickness (d2) of the lithium niobate film 2 formed as the layer of birefringent material and the depth (d1) of the grooves in the glass substrate 1 are so set as to satisfy Eq. 6 or 7, the fabricated polarizing beam splitter will function as a diffraction grating that is capable of insuring that either ordinary or extraordinary light is prevented from diffracting.

Thus, the product of Example 10 comprises the glass substrate 1 as the optically isotropic substrate, which is provided with a periodic pattern of ridges and grooves to from a grating on a surface, with the ridges 1a on the glass substrate 1 being coated with the lithium niobate film 2 as the layer of birefringent material; additionally, d2 (the thickness of the lithium niobate film 2) and d1 (the depth of the grooves in the substrate 1) are so set that the values of OPD(o) or OPD(e) which represent the phase difference of ordinary or extraordinary light, respectively, between a groove (region B) and a ridge (region A) will assume even multiples of $\pi$. Because of these structural features, the product of Example 10 can function as an effective polarizing beam splitter.

Since the optically isotropic substrate 1 is less expensive than the substrate made of a birefringent material, it enables the polarizing beam splitter of Example 10 to be manufactured at a lower cost.

The polarizing beam splitter shown in FIG. 2 is characterized in that the spaces defined by the ridges and grooves in the glass substrate 1 and the lithium niobate film 2 serving as the layer of birefringent material are filled with a material having a refractive index equal to either no (the refractive index of the lithium niobate film 2 with respect to ordinary light) or ne, (the index for extraordinary light). Even with this polarizing beam splitter, one may set the thickness of the lithium niobate film 2 and the depth of grooves 1b in the glass substrate 1 in such a way as to satisfy Eq. 8 or 9 and this enables the lithium niobate film 2 to diffract either ordinary or extraordinary light as in Examples 8 and 9.

EXAMPLE 11

Example 11 of the invention will now be described with reference to accompanying drawings. The polarizing beam splitter of Example 11 has substantially the same construction as that of Example 2 which is shown in FIG. 3. The polarizing beam splitter of Example 11 differs from that of Example 2 in that a lithium niobate film rather than the oriented polydiacetylene film is formed as the layer of birefringent material. Hence, the following description of the polarizing beam splitter of Example 11 is based on FIG. 3 which is the longitudinal section used to explain Example 2.

The polarizing beam splitter of Example 11 as shown in FIG. 3 also differs from that of Example 10 in that grooves 1b with the predetermined depth d1 in the glass substrate 1 are additionally provided with a layer of birefringent material, such as a lithium niobate film 12 in a thickness of d3.

If, as in Example 2, the thicknesses (d2, d3) of the lithium niobate films 2 and 12, respectively, as the layers of birefringent material and the depth (dl) of the glass substrate 1 are so set as to satisfy Eq. 15 or 16, the polarizing beam splitter of Example 11 will effectively function as a diffraction grating that prevents either ordinary or extraordinary light from diffracting.

If d2=d3, Eq. 19 becomes zero and, hence, this condition is excluded from the applicable scope of the invention.

Of course, the polarizing beam splitter of Example 11 which is constructed in the manner described above can achieve the same result as the beam splitter of Example 10.

It should also be noted that the film on the ridges may be formed of a different birefringent material than the film deposited in the grooves. Even in this case, the calculations described above will apply equally.

EXAMPLE 12

Example 12 of the invention will now be described with reference to accompanying drawings. The polarizing beam splitter of Example 12 has substantially the same construction as that of Example 3 which is shown in FIG. 4. The polarizing beam splitter of Example 12 differs from that of Example 3 in that a lithium niobate film rather than the oriented polydiacetylene film is formed as the layer of birefringent material. Hence, the following description of the polarizing beam splitter of Example 12 is based on FIG. 4 which is the longitudinal section used to explain Example 3.

The polarizing beam splitter of Example 12 shown in FIG. 4 also differs from those of Examples 10 and 11 in that a lithium niobate film 2 of the greater thickness is formed alternately with a lithium niobate film 22 of the smaller thickness on a flat glass substrate 1.

If, as in Example 3, the thickness (d2) of the lithium niobate film 2 and the thickness (d3) of the lithium niobate film 22 are so set as to satisfy Eq. 22 or 23, the fabricated polarizing beam splitter will effectively work to insure that either ordinary or extraordinary light is prevented from diffracting.

Of course, the thus constructed polarizing beam splitter of Example 12 is capable of achieving the same result as the beam splitters of Examples 10 and 11. It should be added that the polarizing beam splitter shown in FIG. 4 may be modified in such a way that d3, or the thickness of the lithium niobate film 22, is nil.

EXAMPLE 13

Figure 10:
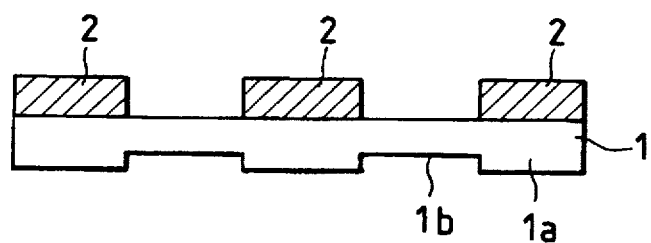
FIG. 10 is a longitudinal section of a polarizing beam splitter according to Example 13 of the invention.

Example 1 13 of the invention will now be described with reference to FIG. 10, which is a longitudinal section of the polarizing beam splitter of Example 13. The polarizing beam splitter of Example 13 differs from that of Example 10 in that grooves 1b are formed in the reverse surface of the glass substrate 1; in other words, the position of the glass substrate 1 relative to the lithium niobate film 2 is reverse to the position taken in FIG. 2.

Of course, the thus constructed polarizing beam splitter of Example 1 13 can operate to achieve the same result as the beam splitter of Example 10.

EXAMPLE 14

Figure 11:
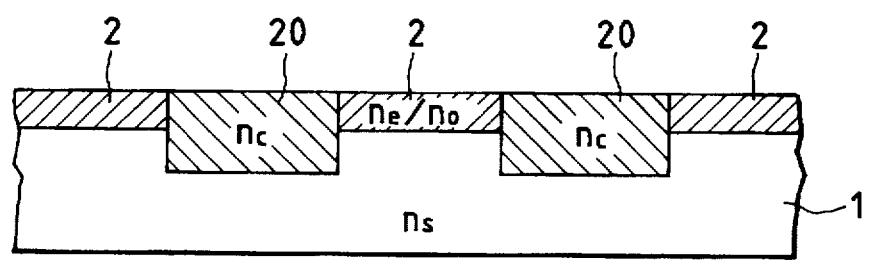
FIG. 11 is a longitudinal section of a polarizing beam splitter according to Example 14 of the invention.

Example 14 of the invention will now be described with reference to FIG. 11, which is a longitudinal section of the polarizing beam splitter of Example 14. The polarizing beam splitter of Example 14 differs from that of Example 10 shown in FIG. 2 in that the spaces defined by the ridges and grooves in the glass substrate 1 and the lithium niobate film 2 are not filled with air but with an isotropic material 20 having a refractive index of nc. As mentioned in Example 10, the value of nc, or the refractive index of the isotropic material 20, is in no way limited and may vary. Of course, the polarizing beam splitter of Example 14 will perform to achieve the same result as the beam splitter of Example 10.

EXAMPLE 15

Figure 12:
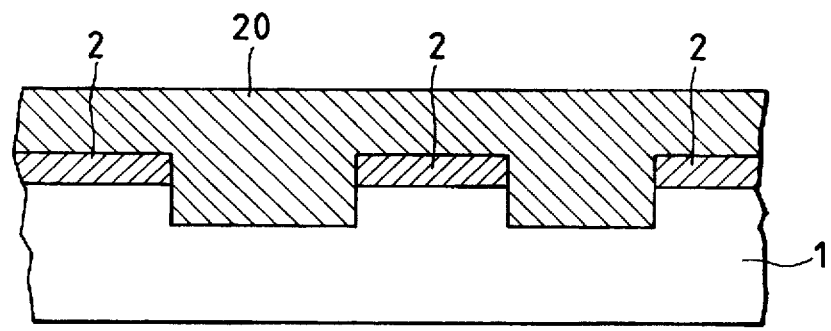
FIG. 12 is a longitudinal section of a polarizing beam. splitter according to Example 15 of the invention.

Example 15 of the invention will now be described with reference to FIG. 12, which is a longitudinal section of the polarizing beam splitter of Example 15. The polarizing beam splitter of Example 15 differs from that of Example 14 in that the spaces defined by the by the ridges and grooves in the glass substrate 1 and the lithium niobate film 2, as well as the spaces above the surfaces of the lithium niobate films 2 are filled not with air but with an isotropic material 20 having a refractive index nc.

Of course, the thus constructed polarizing beams splitter of Example 15 is capable of achieving the same result as the beam splitter of Example 14. It is of course possible and adapted for the purposes of the present invention to fill the grooves in the polarizing beam splitters of Examples 8–10 with the isotropic material 20 having the refractive index nc which is employed in Examples 14 and 15. In another modification, an anti-reflection coat may be provided on either the obverse or reverse surface or both surfaces of the polarizing beam splitters described in Examples 8–15 so as to improve their diffraction efficiency.

EXAMPLE 16

Example 16 of the invention will now be described with reference to accompanying drawings. The polarizing beam splitter of Example 16 has substantially the same construction as that of Example 6 which is shown in FIG. 7. The polarizing beam splitter of Example 16 differs from that of Example 6 in that a lithium niobate film rather than the oriented polydiacetylene film is formed as the layer of birefringent material. Hence, the following description of the polarizing beam splitter of Example 16 is based on FIG. 7 which is the longitudinal section used to explain Example 6.

In Example 16, soda-lime glass is used as the filler material 40.

As discussed in Example 6, OPD(e), or the phase difference of extraordinary light between regions A and B, is calculated by subtracting Eq. 25 from Eq. 27 and expressed by:

$$OPD(e) = (ne - nc) \cdot d2 \cdot k \qquad (28)$$

where $nc = no + m(no - ne)$; (m is an integer) and $$nc = ne + l(no - ne); \text{ (} l \text{ is an integer)}$$

Specifically, no=2.286 and ne=2.20 for lithium niobate, and nc=1.51 for soda-lime glass, and the values of m and are −9 and −8, respectively.

Thus, in Example 16, the glass substrate 1 serving as the optically isotropic substrate is overlaid with the lithium niobate film 2 as the layer of birefringent material which, in turn, is provided with a periodic pattern of ridges and grooves to form a grating, and the grooves in the lithium niobate film 2 are filled with the soda-lime glass 40 as the filler material (excluding materials that have refractive indices generally equal to no, or the refractive index of the film 2 with respect to ordinary light, or he, the index for extraordinary light). Additionally, nc, no and ne are adjusted to satisfy the following relation:

$$nc = no + m(no - ne); (m = \pm 1, \pm 2, \pm 3 \ldots)$$
$$= ne + l(no - ne); (l = \pm 1, \pm 2, \pm 3 \ldots)$$

Thus, the polarizing beam splitter of Example 16 is capable of performing the intended function. Since the optically isotropic substrate 1 is less expensive than the substrate made of a birefringent material, it enables the polarizing beam splitter of Example 16 to be manufactured at a lower cost.

EXAMPLE 17

Example 17 of the invention will now be described with reference to accompanying drawings. The polarizing beam splitter of Example 17 has substantially the same construction as that of Example 7 which is shown in FIG. 8. The polarizing beam splitter of Example 17 differs from that of Example 7 in that a lithium niobate film rather than the oriented polydiacetylene film is formed as the layer of birefringent material. Hence, the following description of the polarizing beam splitter of Example 17 is based on FIG. 8 which is the longitudinal section used to explain Example 7.

The polarizing beam splitter of Example 17 also differs from that of Example 16 in that the grooves in the lithium niobate film 2 are not so deep as to have their bottoms reach the surface of the glass substrate 1 but that a certain thickness of the film 2 is maintained under the grooves. The regions of the lithium niobate film 2 that are defined by the bottoms of the remaining areas 22 and lateral sides of adjacent ridges on the lithium niobate film 2 are filled with a material 40 of the same kind as used in Example 16.

Even with this design, the calculations performed in Example 16 will apply and either OPD(o) or OPD(e) can be rendered to assume even multiples of π, thereby insuring that either one of ordinary and extraordinary lights is prevented from diffracting while the other is allowed to diffract and, hence, the polarizing beam splitter of Example 17 can operate to achieve the same result as the beam splitter of Example 16.

The polarizing beam splitter shown in FIG. 2 comprises the optically isotropic substrate 1 having a periodic pattern of ridges and grooves formed on a surface to define a grating, with the ridges on the substrate 1 being coated with the birefringent material layer 2 and, additionally, the spaces defined by the ridges and grooves in the substrate 1 and the birefringent material layer 2 are filled with soda-lime glass 40 as the filler material (excluding materials that have refractive indices generally equal to no, or the refractive index of the layer 2 with respect to ordinary light, or ne, the index for extraordinary light) and, what is more, the device is so constructed that the relationship expressed by the following equation will hold between nc (the refractive index of the soda-lime glass 40), no and he:

$$nc = no + m(no - ne); (m = \pm 1, \pm 2, \pm 3 \ldots)$$
$$= ne + l(no - ne); (l = \pm 1, \pm 2, \pm 3 \ldots)$$

Even with this polarizing beam splitter, one may set the thickness of the birefringent material layer 2 and the depth of grooves 1b in the substrate 1 in such a way as to satisfy Eq. 10 and Eq. 8 or 9 and this enables the beam splitter to operate and achieve the same result as the devices of the preceding examples.

EXAMPLE 18

Example 18 of the invention will now be described with reference to FIGS. 13a and 13b, which are longitudinal sections of the polarizing beam splitter of Example 18.

Figure 13A:
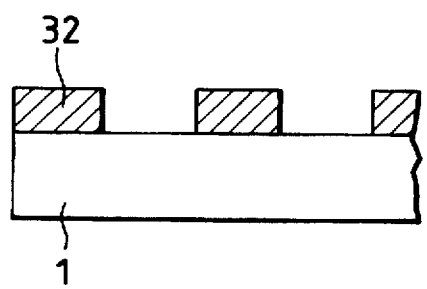
FIGS. 13a and 13b are longitudinal sections of polarizing beam splitters as constructed in Example 18 of the invention.

The polarizing beam splitter shown in FIG. 13a differs from that of Example 1 in that lithium niobate 2 is replaced by quartz 32 while the filler material 40 is air rather than soda-lime glass. As mentioned in Example 16, quartz has no and ne values of 1.52 and 1.48, respectively; in Example 18, air is selected as a filler material that satisfies the equation nc=no+m(no–ne) (where mis an integer). Substituting the actual data into this equation, one gets:

$$nc=1.0=1.52-13(1.52-1.48)$$

Therefore, can has no particular need to fill the grooves in the birefringent material with a special material but filling them with air is sufficient for the polarizing beam splitter of Example 18 to perform and achieve the same result as the device of Example 16.

Figure 13B:
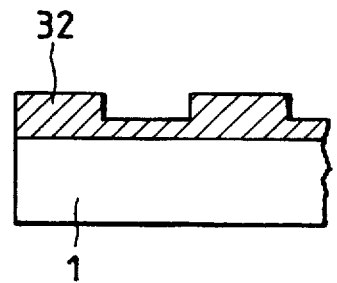

Of course, equally good results can be achieved by using air as a groove filler material in the construction shown in FIG. 13b which is similar to the device of Example 17.

Quartz is not the sole example of the material that can be substituted for lithium niobate in Example 18 and an alternative choice is calcite having no and ne values of 1.64 and 1/48, respectively. Even in this case, air can be used as a filler material since nc=1.0=1.64–4(1.64–1.48).

The foregoing Examples 8–18 refer to the case where the birefringent film is formed directly on the isotropic substrate but it should be noted that equally good results can be attained even if an adhesive layer is interposed between the substrate and the birefringent film. Examples 8–18 also refer to the cases of using quartz, lithium niobate and calcite as birefringent materials but it should of course be noted that these are not the sole examples of the birefringent material that can be used in the invention.

While the present invention has been described above with particular reference to Examples 8–18, it should be understood that the invention is by no means limited to those examples and that various modifications are possible without departing from the spirit and scope of the invention.

EXAMPLE 19

Example 19 of the invention will now be described with reference to FIG. 14, which is a longitudinal section of the polarizing beam splitter of Example 19.

Figure 14:
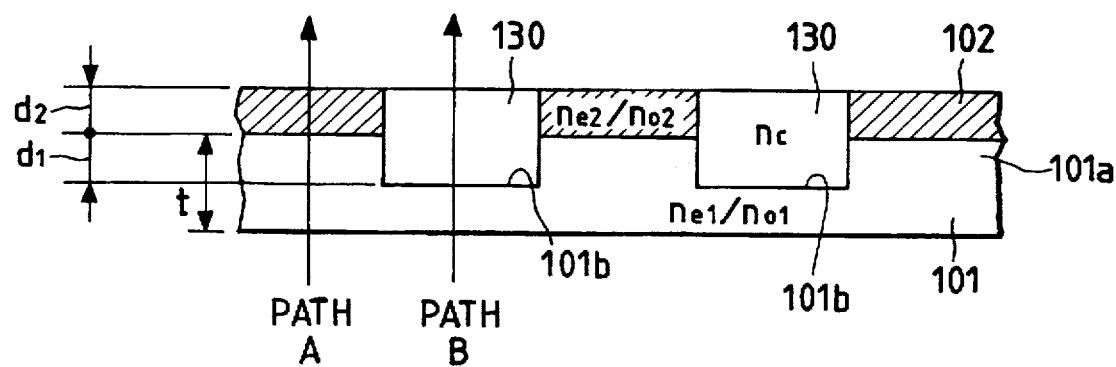
FIG. 14 is a longitudinal section of a polarizing beam splitter according to Example 19 of the invention.

Referring to FIG. 14, a birefringent substrate formed of a birefringent material such as calcite is shown by 101. A surface of the birefringent substrate 101 is provided with a periodic pattern of ridges and grooves to from a grating. Ridges 101a on the surface of the birefringent substrate 101 are overlaid with the layer of a birefringent material different from the material of which the substrate 101 is made. In Example 19, quartz 102 is used as such a dissimilar birefringent material. The spaces defined by the ridges and grooves in the substrate 101 and by the birefringent material layer 102 are filled with an isotropic filler material 130.

For the purpose of the present scission, take the following assumptions: the birefringent substrate 101 has a thickness of t; the grooves 101b in the substrate 101 have a depth of d1; the birefringent material layer 102 has a thickness of d2; the substrate 101 has refractive indices of no1 and ne1 for ordinary and extraordinary lights, respectively; the birefringent material layer 102 has refractive indices of no2 and ne2 for ordinary and extraordinary lights, respectively; the filler material 130 has a refractive index of nc; light has a wavelength of λ; and k=2π/λ.

Ordinary light passing through the polarizing beam splitter in region A (see FIG. 14) where the birefringent material layer 102 is formed has a phase as expressed by:

$$\{no1 \cdot t + no2 \cdot d2\}k \qquad (31)$$

Ordinary light passing through the polarizing beam splitter in region B (see FIG. 14) where the birefringent material layer 102 is not formed has a phase as expressed by:

$$\{no1(t-d1)+nc \cdot (d1+d2)\}k \qquad (32)$$

Therefore, the phase difference of ordinary light, OPD(o), is calculated by subtracting Eq. 32 from Eq. 31 and expressed by:

$$OPD(o) = \{(no1-nc)d1+(no2-nc)d2\}k \qquad (33)$$

On the other hand, extraordinary light passing through region A has a phase as expressed by:

$$\{ne1 \cdot t + ne2 \cdot d2\} \qquad (34)$$

Extraordinary light passing through region B has a phase as expressed by:

$$\{no1(t-d1)+nc \cdot (d1+d2)\}k \qquad (35)$$

Here, the phase difference of extraordinary light, OPD(e), is calculated by subtracting Eq. 35 from Eq. 34 and expressed by:

$$OPD(e) = \{(ne1-nc)d1+(ne2-nc)d2\}k \qquad (36)$$

In order to insure that extraordinary light will not diffract, one need allow Eq. 36 to assume even multiples of $\pi$ and, hence:

$$OPD(e) = \{(ne1-nc)d1+(ne2-nc)d2\}k \qquad (37)$$
$$= 2p\pi \; (p=0, \pm 1, \pm 2 \ldots)$$

Additionally, in order to insure that ordinary light not diffract, one need allow Eq. 33 to assume even multiples of $\pi$ and, hence:

$$OPD(o) = \{(no1-nc)d1+(no2-nc)d2\}k \qquad (38)$$
$$= 2p\pi \; (p=0, \pm 1, \pm 2 \ldots)$$

Under these two conditions, both ordinary and extraordinary lights may contain an undiffracted component depending on the settings of d1 and d2. The polarizing beam splitter of Example 19 is typically used in a pickup on an optical disk system. In such applications, it is desirable that either ordinary or extraordinary light be totally diffracted while the other is not diffracted at all. To this end, one needs to insure that not only Eq. 37 but also the following equation holds:

$$OPD(o) = \{(no1-nc)d1+(no2-nc)d2\}k \qquad (39)$$
$$= (2q+1)\pi \; (q=0, \pm 1, \pm 2 \ldots)$$

Alternatively, one needs to insure that not only Eq. 38 but also the following equation holds:

$$OPD(e) = \{(ne1-nc)d1+(ne2-nc)d2\}k \qquad (40)$$
$$= (2q+1)\pi \; (q=0, \pm 1, \pm 2 \ldots)$$

In this case, one may determine the value of d2, the thickness of the birefringent material layer 102, in such a way that the following equation obtained by subtracting Eq. 37 from Eq. 39 and Eq. 40 from Eq. 38 will hold:

$$[OPD(o) - OPD(e)] = \{(no1-ne1)d1+(no2-ne2)d2\}k \qquad (41)$$
$$= (2j+1)\pi \; (j=0, \pm 1, \pm 2 \ldots)$$

If d2, the thickness of the birefringent material layer 102, and d1, the depth of the grooves in the birefringent substrate 101, are set in such a way that either Eq. 37 or 38 is satisfied, the polarizing beam splitter under consideration will effectively function as a diffraction grating to insure that either ordinary or extraordinary light is prevented from diffracting.

Thus, the polarizing beam splitter of Example 19 comprises the substrate 101 which is made of calcite as a birefringent material and which has a periodic pattern of ridges and grooves formed on a surface to define a grating, with the ridges 101a on the birefringent substrate 101 being provided with quartz 102 that is formed as the layer of a birefringent material different from the material of which the substrate 101 is made. The values of d2, the thickness of the quartz 102 and d1, the depth of the grooves in the substrate 101 are so set that either OPD(o), the phase difference of ordinary light, or OPD(e), the phase difference of extraordinary light, between ridge 101a and groove 101b, will assume even multiples of $\pi$. Because of this arrangement, the polarizing beam splitter is capable of performing the intended function as described above.

The polarizing beam splitter under discussion does not use proton exchange areas or a position compensating dielectric grating of the types described in the Prior Art Section and it can be fabricated by making grooves 101b in the birefringent material film 102 and in the birefringent substrate simultaneously through a single step of a suitable process such as etching; this contributes to an improvement in positional precision.

As a further advantage, registration can automatically be accomplished by merely filling the grooves 101b with the filer material 130 and this helps provide ease in device fabrication.

EXAMPLE 20

Figure 15:
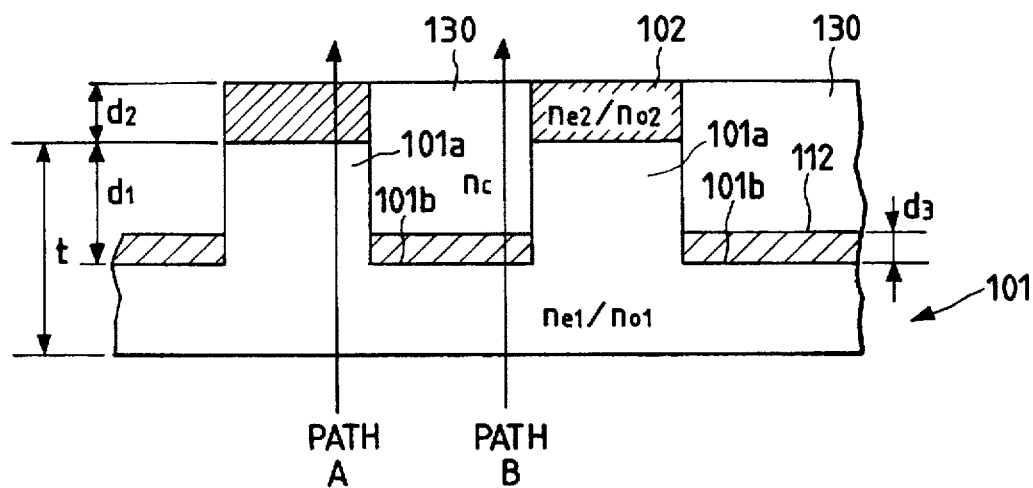
FIG. 15 is a longitudinal section of a polarizing beam splitter according to Example 20 of the invention.

FIG. 15 is a longitudinal section of the polarizing beam splitter of Example 20. The polarizing beam splitter of Example 20 differs from that of Example 19 in that a birefringent material layer 112 formed of the same material as the birefringent material layer 102 is additionally formed in a thickness of d3 in the grooves 101b of the predetermined depth d1 in the birefringent substrate 101.

Ordinary light passing through region A (see FIG. 15) has a phase as expressed by:

$$\{no1 \cdot t + no2 \cdot d2\}k \qquad (31)$$

Ordinary light passing through region B (also see FIG. 15) has a phase as expressed by:

$$\{no1(t-d1)+no2 \cdot d3+nc(d1+d2-d3)\}k \qquad (42)$$

Therefore, the phase difference of ordinary light, OPD(o), is calculated by subtracting Eq. 42 from Eq. 31 and expressed by:

$$OPD(o) = \{(d2-d3)no2+no1 \cdot d1 - nc(d1+d2-d3)\}k \qquad (43)$$

On the other hand, extraordinary light passing through region A has a phase as expressed by:

$\{ne1 \cdot t + ne2 \cdot d2\}$ (34)

Extraordinary light passing through region B has a phase as expressed by:

$$\{ne1(t-d1) + ne2 \cdot d3 + nc(d1+d2-d3)\}k \quad (44)$$

Therefore, the phase difference of extraordinary light, OPD(e), is calculated by subtracting Eq. 44 from Eq. 34 and expressed by:

$$OPD(e) = \{(d2-d3)ne2 + ne1 \cdot d1 - nc(d1+d2-d3)\}k \quad (45)$$

In order to insure that extraordinary light will not diffract, one need allow Eq. 45 to assume even multiples of $\pi$ and, hence:

$$\begin{aligned}OPD(e) &= \{(d2-d3)ne2 + ne1 \cdot d1 - \\ & \quad nc(d1+d2-d3)\}k \\ &= 2p\pi \, (p=0, \pm1, \pm2 \ldots)\end{aligned} \quad (46)$$

Additionally, in order to insure that ordinary light will not diffract, one needs to allow Eq. 43 to assume even multiples of and, hence:

$$\begin{aligned}OPD(o) &= \{(d2-d3)no2 + no1 \cdot d1 - \\ & \quad nc(d1+d2-d3)\}k \\ &= 2p\pi \, (p=0, \pm1, \pm2 \ldots)\end{aligned} \quad (47)$$

Under these two conditions, both ordinary and extraordinary lights may contain an undiffracted component depending on the settings of d1, d2 and d3. The polarizing beam splitter of Example 20 is typically used in a pickup on an optical disk system. In such applications, it is desirable that either one of ordinary and extraordinary lights be totally diffracted while the other is not diffracted at all. To this end, one needs to insure that non only Eq. 46 but also the following equation holds:

$$\begin{aligned}OPD(o) &= \{(d2-d3)no2 + no1 \cdot d1 - \\ & \quad nc(d1+d2-d3)\}k \\ &= (2q+1)\pi \, (q=0, \pm1, \pm2 \ldots)\end{aligned} \quad (48)$$

Alternatively, one needs to insure that not only Eq. 47 but also the following equation holds:

$$\begin{aligned}OPD(e) &= \{(d2-d3)ne2 + ne1 \cdot d1 - \\ & \quad nc(d1+d2-d3)\}k \\ &= (2q+1)\pi \, (q=0, \pm1, \pm2 \ldots)\end{aligned} \quad (49)$$

In this case, one may determine the values of d2 and d3, or the thicknesses of the birefringent material layers 102 and 112, respectively, in such a way that the following equation obtained by subtracting Eq. 46 from Eq. 48 and Eq. 49 from Eq. 47 will hold:

$$\begin{aligned}[OPD(o) - OPD(e)] &= \{(no2-ne2) \cdot (d2-d3) + d1(no1-ne1)\}k \\ &= (2j+1)\pi \, (j=0, \pm1, \pm2)\end{aligned} \quad (50)$$

If d2 and d3, the respective thicknesses of the birefringent material layers 102 and 103, and d1, the depth of the grooves in the birefringent substrate 101, are set in such a way that either Eq. 46 or 47 is satisfied, the polarizing beam splitter under consideration will effectively function as a diffraction grating to insure that either ordinary or extraordinary light is prevented from diffracting.

Of course, the polarizing beam splitter of Example 20 which is constructed in the manner described above can achieve the same result as the beam splitter of Example 19.

EXAMPLE 21

Figure 16:
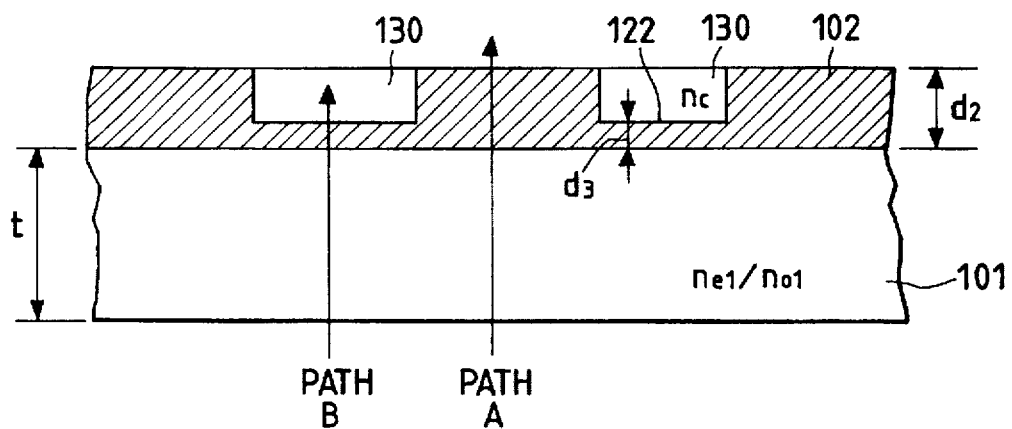
FIG. 16 is a longitudinal section of a polarizing beam splitter according to Example 21 of the invention.

FIG. 16 is a longitudinal section of a polarizing beam splitter according to Example 21 of the invention. The polarizing beam splitter of Example 21 differs from those of Examples 19 and 20 in that a birefringent material layer 102 of the greater thickness is formed alternately with a birefringent material layer 122 of the smaller thickness on a flat birefringent substrate 101.

In Example 20, calculations can b made by the sam procedures as in Example 19 and 20, resulting in:

$$OPD(o) = \{(d2-d3) \cdot (no2-nc)\} \cdot k$$

$$OPD(e) = \{(d2-d3) \cdot (ne2-nc)\} \cdot k$$

Hence, as in Examples 19 and 20, one needs to satisfy the following condition in order to insure that ordinary light will not diffract:

$$\begin{aligned}OPD(o) &= \{(d2-d3) \cdot (no2-no)\} \cdot k \\ &= 2q\pi \, (q=0, 1, 2 \ldots)\end{aligned} \quad (51)$$

In order to insure that extraordinary light will not diffract, one needs to satisfy the following condition:

$$\begin{aligned}OPD(e) &= \{(d2-d3) \cdot (ne2-nc)\} \cdot k \\ &= 2q\pi \, (q=0, 1, 2 \ldots)\end{aligned} \quad (52)$$

If d2, the thickness of the birefringent material layer 102, and d3, the thickness of the birefringent material layer 122, are set in such a way that either Eq. 51 or 52 is satisfied, the polarizing beam splitter under consideration will insure that either ordinary or extraordinary light is prevented from diffracting.

Of course, the thus constructed polarizing beam splitter of Example 21 can achieve the same result as the beam splitters of Examples 19 and 20.

In Examples 19–21, the grooves are filled with the isotropic material 130 having the refractive index nc. If desired, the filler 130 may be air (nc=1).

It should be added that the polarizing beam splitters of Examples 19 and 20 may be modified in such a way that the refractive index of the filler 130 is set to satisfy the following equation; in this case, d1 =0 and the depth of the grooves in the birefringent substrate 101 is nil, which means there is no need to form grooves in the substrate 101:

$$nc = m \cdot \ln o2 - ne2 + no2 \, (or \, ne2)$$

(m is an integer).

The polarizing beam splitter of Example 21 may also be modified in such a way that the filler has a refractive index that satisfies the following conditions:

$$OPD(o) = 2q\pi \text{ and } OPD(e) = (2p+1)\pi \text{ or } OPD(o) = (2p+1)\pi \text{ and } OPD(e) = 2q\pi$$

In this case, not only is it possible to prevent either one of ordinary and extraordinary lights from diffracting but it is also possible to insure complete diffraction of the other and the polarizing beam splitter having this capability is suitable for use as an optical isolator or in differential detection on optical heads.

It should also be noted that each of the polarizing beam splitters described in Examples 19–21 may be provided with an anti-reflection coat on either the obverse or reverse face or on both sides and this contributes to an improvement in the overall efficiency of the utilization of light.

The optical axis of the birefringent substrate 101 is set to be generally parallel or perpendicular to the optical axis of the birefringent material layer 102. Additionally, the direction or pattern of grooves 101b can be set independently of the optical axes of the birefringent substrate 101 and the birefringent material layer 102 so as to increase the degree of freedom in design.

The foregoing Examples 19–21 refer to the case where the birefringent layer is formed directly on the birefringent substrate. It should, however, be noted that equally good results can be achieved even if an adhesive layer is interposed between the birefringent substrate and the birefringent material layer.

EXAMPLE 22

Example 22 of the invention will now be described with reference to FIG. 17, which is a longitudinal section of the polarizing beam splitter of Example 22.

Figure 17:
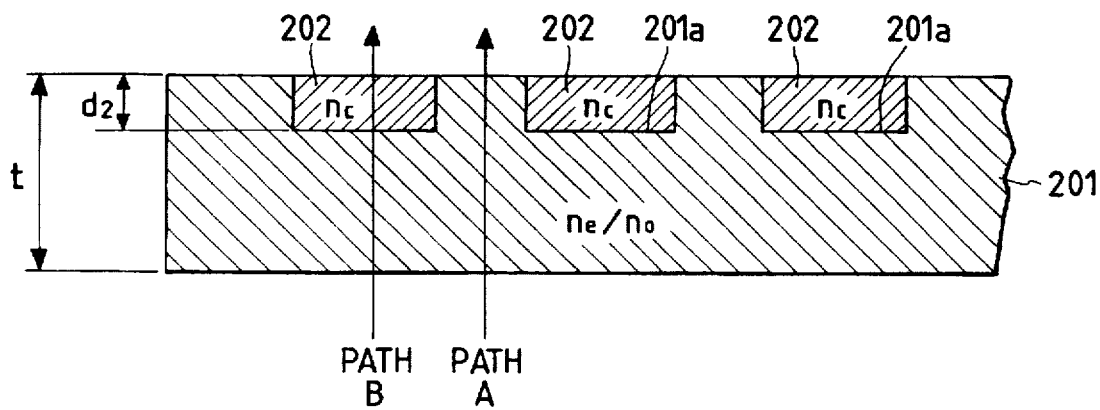
FIG. 17 is a longitudinal section of a polarizing beam splitter according to Example 17 of the invention.

Referring to FIG. 17, a birefringent substrate typically made of lithium niobate is shown by 201. A surface of the birefringent substrate 201 is provided with a periodic pattern of ridges and grooves to form a grating. Grooves 201a in the birefringent substrate 201 are filled with a filler material that has a refractive index (nc) of a value that lies between no (the refractive index of niobium lithium for ordinary light) and ne (the index for extraordinary light) and which satisfies Eq. 67 or 68 to be given below (excepting materials having refractive indices generally equal to no or ne). In Example 22, the filler material is soda-lime glass 202.

For the purpose of the present discussion, take the following assumptions: the birefringent substrate 201 has a thickness of t; the filler material 202 has a thickness of d2; the birefringent substrate 201 has the refractive indices no and ne for ordinary and extraordinary lights, respectively; the filler material 202 has the refractive index nc; light has a wavelength of $\lambda$; and $k=2\pi/\lambda$.

Ordinary light passing through the polarizing beam splitter in region A (see FIG. 17) where the filler material is absent has a phase as expressed by:

$$no \cdot t \cdot k \tag{61}$$

Ordinary light passing through the polarizing beam splitter in region B (also see FIG. 17) where the filler material 202 is present has a phase as expressed by:

$$\{no(t-d2)+nc \cdot d2\} \cdot k \tag{62}$$

Therefore, OPD(o), or the phase difference of ordinary light between regions A and B, is calculated by subtracting Eq. 62 from Eq. 61 and expressed by:

$$OPD(o)=(no-nc) \cdot d2 \cdot k \tag{63}$$

On the other hand, the phase of extraordinary light passing through region A is expressed by:

$$ne \cdot t \cdot k \tag{64}$$

The phase of extraordinary light passing through region B is expressed by:

$$\{ne(t-d2)+nc \cdot d2\} \cdot k \tag{65}$$

Therefore, OPD(e), or the phase difference of extraordinary light between regions A and B, is calculated by subtracting Eq. 65 from Eq. 64 and expressed by:

$$OPD(e)=(ne-nc) \cdot d2 \cdot k \tag{66}$$

In order to insure that either ordinary or extraordinary light is selectively diffracted, one need allow either Eq. 63 or 66 to assume even multiples of $\pi$. If ordinary light alone is to be diffracted, the condition to be satisfied is OPD(e)= $2p\pi$ (p=0, ±1, ±2 . . . ); if extraordinary light alone is to be diffracted, the condition to be satisfied is OPD(o)=$2p\pi$ (p=0, ±1, ±2 . . . ).

However, under these conditions, both ordinary and extraordinary lights may contain an undiffracted component depending on the setting of d2. The polarizing beam splitter of Example 22 is typically used in a pickup on an optical disk system. In such applications, it is desirable that either one of ordinary and extraordinary lights be totally diffracted while the other is not diffracted at all. To this end, the following conditions must be satisfied:

$$OPD(o)=2p\pi(p=0, \pm1, \pm2 \ldots) \text{ and}$$

$$OPD(e)=(2q+1)\pi(q=0, \pm1, \pm2 \ldots)$$

or, alternatively, $$OPD(o)=(2q+1)\pi(q=0, \pm1, \pm2 \ldots) \text{ and}$$

$$OPD(e)=2p\pi(p=0, \pm1, \pm2 \ldots)$$

These conditions can be rewritten as:

$$OPD(o) - OPD(e) = (2i + 1)\pi \ (i = 0, \pm1, \pm2 \ldots)$$

i.e., $$\begin{aligned} OPD(o) - OPD(e) &= \{(no - ne) - (ne - nc)\} \cdot d2 \cdot k \\ &= (no - ne) \cdot d2 \cdot k \\ &= 2(2i + 1)\pi \ (i = 0, \pm1, \pm2 \ldots) \end{aligned}$$

Thus, d2 can take an infinite number of values depending on the value of i but a minimum value of d2 is obtained when i=0 or i =−1, in which case, d2=$\pi$/{k·|no−ne|}=$\lambda$/{2·|no−ne|}.

Given this minimum value of d2, one of OPD(o) and OPD(e) must assume even multiples of $\pi$ whereas the other must assume odd multiples of $\pi$. The filler material selected in Example 22 satisfies the following nc conditions:

$$nc=no+m(no-ne) \ (m=\pm1, \pm2 \ldots) \tag{67}$$

and $$nc=ne+l(no-ne) \ (l=\pm1, \pm2 \ldots) \tag{68}$$

Therefore, $$OPD(e) = (ne - nc) \cdot d2 \cdot k$$
$$= \{(ne - nc)/(no - ne)\}\pi$$
$$= \{-l(no - ne) \cdot \pi/(no - ne)$$
$$= -l\pi.$$

Hence, if $l$ in $nc=ne+l(no-ne)$ for the filler material is even-numbered, extraordinary light will not be diffracted at all whereas ordinary light will be totally diffracted; if $l$ is odd-numbered, extraordinary light will be totally diffracted whereas ordinary light will not be diffracted at all.

In Example 22, the wavelength of light ($\lambda$) is 0.633 µm and lithium niobate as the birefringent material has no and ne values of 2.286 and 2.2, respectively. Given these data, nc can be calculated as follows:

$$nc = no + m(no - ne)$$
$$= 2.286 - 9 \times 0.086$$
$$= 1.512$$

or $$nc = ne + l(no - ne)$$
$$= 2.2 - 8 \times 0.086$$
$$= 1.512$$

To meet these requirements, soda-lime glass is used as the filler material in Example 22.

Thus, the polarizing beam splitter of Example 22 comprises the birefringent substrate 201 which is made of lithium niobate as a birefringent material and which is provided with a periodic pattern of ridges and grooves to form a grating on a surface and, additionally, grooves 201a in the substrate 201 are filled with soda-lime glass 202 as a filler material that has the refractive index nc which lies between no (the refractive index of the birefringent material for ordinary light) and ne (the index for extraordinary light) and which satisfies Eq. 67 or 68 (excepting materials having refractive indices generally equal to no or he). Having these structural features, the polarizing beam splitter of Example 22 is capable of performing the intended function as described above.

Since the refractive index nc of the filler material 202 needs only to satisfy Eq. 67 or 68, the latitude in the selection of filler materials is greater than in the prior art and this contributes to an improvement in the degree of freedom in design.

EXAMPLE 23

Example 23 of the invention uses quartz as the material of the birefringent substrate. Quartz has no and ne values of 1.52 and 1.48, respectively. Assume that m and l are −13 and −12, respectively. Substituting these values into the pertinent equations, one gets:

$$nc = no + m(no - ne)$$
$$= 1.52 - 13 \times 0.04$$
$$= 1.0$$

and $$nc = ne + l(no - ne)$$
$$= 1.48 - 12 \times 0.04$$
$$= 1.0$$

Hence, air can be used as the filler material under the condition $d2=\pi/\{k \cdot |no-ne|\}=\lambda/\{2 \cdot |no-ne|\}$.

EXAMPLE 24

Example 24 of the invention uses calcite as the material of the birefringent substrate. Calcite has no and ne values of 1.64 and 1.48, respectively. Assume that m and l are −4 and −3, respectively. Substituting these values into the pertinent equations, one gets:

$$nc = no + m(no - ne)$$
$$= 1.64 - 4 \times 0.16$$
$$= 1.0$$

and $$nc = ne + l(no - ne)$$
$$= 1.48 - 3 \times 0.16$$
$$= 1.0$$

Hence, air can be used as the filler material under the condition $d2=\pi/\{k \cdot |no-ne|\}=\lambda/\{2 \cdot |no-ne|\}$.

While the present invention has been described above with particular reference to Examples 22–24, it should be understood that the invention is by no means limited to those examples and that various modifications are possible without departing from the spirit and scope of the invention. For example, lithium niobate, quartz and calcite which are used in the birefringent substrate 201, as well as soda-lime glass used as filler material 202 may be changed to other suitable materials.

As will be understood from the foregoing description, the polarizing beam splitter of the invention has the following advantages:

(1) The polydiacetylene film formed on the substrate is inherently small in the temperature dependency of refractive index and, hence, it contributes to enhancement in the environmental resistance of the polarizing beam splitter;

(2) Apropos of (1) above, the polydiacetylene film has o inherently high crystallinity and hence contributes to uniformity in the characteristics of the polarizing beam splitter;

(3) Also apropos of (1), the polydiacetylene film causes a great degree of birefringence and, hence, it can be formed in a sufficiently small thickness to realize a compact polarizing beam splitter;

(4) If the substrate is made of an optically isotropic material which is less expensive than birefringent materials, the polarizing beam splitter can be manufactured at a lower cost;

(5) Apropos of (4), optical devices such as an optical head assembly using the polarizing beam splitter can also be manufactured at a lower cost;

(6) The polarizing beam splitter does not use proton exchange areas or a position compensating dielectric grating of the types described in the Prior Art Section and it can be fabricated by making grooves in the diffraction grating and in the substrate simultaneously through a single step of a suitable process such as etching and this contributes to an improvement in positional precision;

(7) Registration can automatically be accomplished by merely filling the grooves with the filler material and this helps provide ease in the fabrication of a polarizing beam splitter; additionally, an optical head assembly using the polarizing beam splitter is not only improved in positional precision but it can also be manufactured with ease;

(8) The polarizing beam splitter may comprise a birefringent substrate that is made of a birefringent material and which has a periodic pattern of ridges and grooves formed on a surface to make a grating and the grooves are filled with an optically isotropic material; additionally, it is designed to satisfy the following relationship between the refractive index of the optically isotropic material (nc), the refractive index of the birefringent material for ordinary light (no) and the index for extraordinary light (ne):

$$nc = no + m(no - ne); (m = \pm 1, \pm 2, \pm 3 \ldots)$$
$$= ne + l(no - ne); (l = \pm 1, \pm 2, \pm 3 \ldots)$$

Since the refractive index of the filler material (nc) needs only to satisfy this equation, the latitude in the selection of filler materials is greater than in the prior art and this contributes to an improvement in the degree of freedom in design.

What is claimed is:

1. A polarizing beam splitter comprising:
   an optically isotropic substrate;
   a layer of birefringent material formed on said optically isotropic substrate; and
   a periodic pattern of ridges and grooves formed on a surface of said optically isotropic substrate to form a grating,
   wherein said grooves are filled with an optically isotropic material that has a refractive index (nc) that satisfies the following relationship with the refractive index of said birefringent material for ordinary light (no) and the refractive index for extraordinary light (ne):

$$nc = no + m(no-ne); (m = \pm 1, \pm 2, \pm 3 \ldots)$$
$$= ne + l(no-ne); (l = \pm 1, \pm 2, \pm 3 \ldots).$$

2. The polarizing beam splitter according to claim 1, wherein said layer of birefringent material is an oriented polydiacetylene film.

3. An optical head assembly comprising:
   a light source;
   an objective lens;
   beam splitting means for separating a beamlet directed from said light source toward an information recording medium and a beamlet reflected by said information recording medium;
   an optical detector for receiving the reflected beamlet; and
   a polarizing beam splitter comprising:
   an optically isotropic substrate;
   a layer of birefringent material formed on said optically isotropic substrate; and
   a periodic pattern of ridges and grooves formed on a surface of said optically isotropic substrate to form a grating,
   wherein said grooves are filled with an optically isotropic material that has a refractive index (ne) that satisfies the following relationship with the refractive index of said birefringent material for ordinary light (no) and the refractive index for extraordinary light (ne):

$$nc = no + m(no-ne); (m = \pm 1, \pm 2, \pm 3 \ldots)$$
$$= ne + l(no-ne); (l = \pm 1, \pm 2, \pm 3 \ldots),$$

said polarizing beam splitter being provided in the optical path between said beam splitting means and said optical detector.

4. The optical head assembly according to claim 3 wherein said birefringent material in said polarizing beam splitter has its optical axis set to be inclined at an angle of approximately 45 degrees with respect to the direction of polarization of the reflected light from said information recording medium.

5. An optical head assembly comprising:
   a light source;
   an objective lens;
   a quarter wavelength ($\lambda/4$) plate;
   an optical detector for receiving the beam reflected from an information recording medium;
   a polarizing beam splitter comprising:
   an optically isotropic substrate;
   a layer of birefringent material formed on said optically isotropic substrate; and
   a periodic pattern of ridges and grooves formed on a surface of said optically isotropic substrate to form a grating,
   wherein said grooves are filled with an optically isotropic material that has a refractive index (nc) that satisfies the following relationship with the refractive index of said birefringent material for ordinary light (no) and the refractive index for extraordinary light (ne):

$$nc = no + m(no - ne); (m = \pm 1, \pm 2, \pm 3 \ldots)$$
$$= ne + l(no - ne); (l = \pm 1, \pm 2, \pm 3 \ldots),$$

said polarizing beam splitter being provided in the optical path between said light source and said optical detector,
wherein the beam from said light source is admitted into said polarizing beam splitter in such a way that the phase difference of the light from said light source with respect to each of the ridges and grooves in said polarizing beam splitter is an even multiple of $\pi$.

6. A polarizing beam splitter comprising:
   an optically isotropic substrate;
   a layer of birefringent material formed directly on top of said optically isotropic substrate and being in contact with said optically isotropic substrate; and
   a periodic pattern of ridges and grooves formed on a surface of said optically isotropic substrate, including said birefringent material, to make a grating;
   wherein a refractive index of said birefringent material is equal to one of the refractive index for ordinary light and the refractive index for extraordinary light;
   wherein said layer of birefringent material is an oriented polydiacetylene film.

7. A polarizing beam splitter, comprising:
   an optically isotropic substrate;
   a layer of birefringent material formed on top of said optically isotropic substrate; and
   a periodic pattern of ridges and grooves formed on said layer of birefringent material,
   wherein the thickness of said layer of birefringent material on the ridges and the depth of the grooves in said layer of birefringent material are set so that one of the phase difference of ordinary light between each of said ridges and grooves and the phase difference between each of said ridges and grooves of extraordinary light is an even multiple of $\pi$;
   wherein said layer of birefringent material is an oriented polydiacetylene film.

33

8. A polarizing beam splitter, comprising:

an optically isotropic substrate;

a periodic pattern of ridges and grooves formed on a surface of said optically isotropic substrate to make a grating; and a layer of birefringent material formed at least on the ridges of the grating on said optically isotropic substrate;

wherein the thickness of said layer of birefringent material and the depth of the grooves in said optically isotropic substrate are set so that one of the phase difference of ordinary light between each of said ridges and grooves and the phase difference between each of said ridges and grooves of extraordinary light is an even multiple of $\pi$;

wherein said layer of birefringent material is an oriented polydiacetylene film.

9. The polarizing beam splitter according to any one of claims 8 and 2, wherein a film layer for causing orientation in said polydiacetylene film is provided between said optically isotropic substrate and said layer of birefringent material.

10. The polarizing beam splitter according to any one of claims 6, 8 and 2, wherein one of the obverse, the reverse surface, and both surfaces of said polarizing beam splitter is provided with an anti-reflection coating.

11. A polarizing beam splitter comprising:

a substrate made of a birefringent material;

a layer of a different birefringent material formed on top of said birefringent substrate; and a periodic pattern of ridges and grooves formed on said layer of different birefringent material to make a grating, wherein the thickness of the ridges on said layer of different birefringent material and the depth of the grooves in said layer of different birefringent material being set so that one of the phase difference of ordinary light between each of said ridges and grooves and the phase difference of extraordinary light between each of said ridges and grooves is an even multiple of $\pi$.

12. A polarizing beam splitter comprising:

a substrate made of a birefringent material;

a layer of a different birefringent material formed on top of said birefringent substrate; and a periodic pattern of ridges and grooves formed on said layer of different birefringent material to make a grating, wherein the thickness of the ridges on said layer of different birefringent material and the depth of the grooves in said layer of different birefringent material being set so that one of the phase difference of ordinary light between each of said ridges and grooves and the phase difference of extraordinary light between each of said ridges and grooves is an even multiple of $\pi$, wherein the depth of the grooves in said substrate is adjusted to zero by satisfying one of the following relationships when said grooves are filled with a filler material;

$$nc = m \cdot \lambda no2 - ne2| + no2 \ [(or \ ne2)]$$

$$nc = m \cdot \lambda no2 - ne2 + ne2$$

where ne: the refractive index of the filler material (excepting a refractive index value generally equal to the refractive index of the birefringent substrate material for ordinary light or the index for extraordinary light); no2: the refractive index of the layer of birefringent material for ordinary light; ne2: the refractive index of the layer of birefringent material for extraordinary light; and m=±1, ±2, ±3 . . .

13. The polarizing beam splitter according to any one of claim 12, wherein one of the obverse, the reverse surface and both surfaces of said polarizing beam splitter is provided with an anti-reflection coating.

14. An optical head assembly comprising:

a light source;

an objective lens;

beam splitting means by which a beamlet directed from said light source toward an information recording medium is separated from a beamlet reflected by said information recording medium;

an optical detector for receiving the reflected beamlet; and a polarizing beam splitter comprising:

a substrate made of a birefringent material;

a layer of a different birefringent material formed on top of said birefringent substrate; and a periodic pattern of ridges and grooves formed on said layer of different birefringent material to make a grating, wherein the thickness of the ridges on said layer of different birefringent material and the depth of the grooves in said layer of different birefringent material being set so that one of the phase difference of ordinary light between each of said ridges and grooves and the phase difference of extraordinary light between each of said ridges and grooves is an even multiple of $\pi$, said optical beam splitter being provided in the optical path between said beam splitting means and said optical detector.

15. An optical head assembly comprising:

a light source;

an objective lens;

a quarter wavelength ($\lambda/4$) plate;

an optical detector for receiving a beam reflected from an information recording medium;

a polarizing beam splitter comprising:

a substrate made of a birefringent material;

a layer of a different birefringent material formed on top of said birefringent substrate; and a periodic pattern of ridges and grooves formed on said layer of different birefringent material to make a grating, wherein the thickness of the ridges on said layer of different birefringent material and the depth of the grooves in said layer of different birefringent material being set so that one of the phase difference of ordinary light between each of said ridges and grooves and the phase difference of extraordinary light between each of said ridges and grooves is an even multiple of $\pi$, said polarizing beam splitter being provided in the optical path between said light source and said optical detector, wherein the beam from said light source is admitted into said polarizing beam splitter in such a way that the phase difference of the light from the light source with respect to each of the ridges and grooves in said polarizing beam splitter is an even multiple of $\pi$.

16. A polarizing beam splitter, comprising:

a birefringent substrate that is made of a birefringent material; and a periodic pattern of ridges and grooves formed on a surface of said birefringent substrate to make a grating;

wherein said grooves are filled with an optically isotropic material and wherein the refractive index of said optically isotropic material (nc), the refractive index of said birefringent material for ordinary light (no) and the refractive index of said birefringent material for extraordinary light (ne) satisfy the following relationship:

$$nc = no + m(no - ne); (m = \pm 1, \pm 2, \pm 3 \ldots)$$
$$= ne + l(no - ne); (l = \pm 1, \pm 2, \pm 3 \ldots);$$

wherein said birefringent substrate is formed of lithium niobate and said filler material is soda-lime glass.

17. An optical head assembly comprising:

a light source;

an objective lens;

beam splitting means for separating a beamlet directed from said light source toward an information recording medium and a beamlet reflected by said information recording medium;

an optical detector for receiving the reflected beamlet; and a polarizing beam splitter comprising:

an optically isotropic substrate;

a periodic pattern of ridges and grooves formed on a surface of said optically isotropic substrate to make a grating; and a layer of birefringent material formed at least on the ridges of the grating on said optically isotropic substrate;

wherein the thickness of said layer of birefringent material and the depth of the grooves in said optically isotropic substrate are set so that one of the phase difference of ordinary light between each of said ridges and grooves and the phase difference between each of said ridges and grooves of extraordinary light is an even multiple of $\pi$.

18. An optical head assembly comprising:

a light source;

an objective lens;

beam splitting means by which a beamlet directed from said light source toward an information recording medium is separated from a beamlet reflected by said information recording medium;

an optical detector for receiving the reflected beamlet; and a polarizing beam splitter comprising:

a substrate made of a birefringent material;

a periodic pattern of ridges and grooves formed on a surface of said substrate to make a grating; and a layer of a different birefringent material formed on at least the ridges of the grating on said substrate;

wherein the thickness of said layer of different birefringent material and the depth of the grooves in said substrate being set so that one of the phase difference of ordinary light between each of said ridges and grooves and the phase difference of extraordinary light between each of said ridges and grooves is an even multiple of $\pi$, said polarizing beam splitter being provided in the optical path between said beam splitting means and said optical detector.

19. The optical head assembly according to any one of claims 14 or 18, wherein said birefringent material in the polarizing beam splitter has its optical axis set to be inclined at an angle of approximately 45 degrees with respect to the direction of polarization of the reflected light from the information recording medium.

20. An optical head assembly comprising:

a light source;

an objective lens;

a quarter wavelength ($\lambda/4$) plate;

an optical detector for receiving a beam reflected from an information recording medium;

a polarizing beam splitter comprising:

a substrate made of a birefringent material;

a periodic pattern of ridges and grooves formed on a surface of said substrate to make a grating; and a layer of a different birefringent material formed on at least the ridges of the grating on said substrate;

wherein the thickness of said layer of different birefringent material and the depth of the grooves in said substrate being set so that one of the phase difference of ordinary light between each of said ridges and grooves and the phase difference of extraordinary light between each of said ridges and grooves is an even multiple of $\pi$, said polarizing beam splitter being provided in the optical path between said light source and said optical detector, wherein the beam from said light source is admitted into said polarizing beam splitter in such a way that the phase difference of the light from the light source with respect to each of the ridges and grooves in said polarizing beam splitter is an even multiple of $\pi$.

* * * * *